United States Patent [19]

Kagaya

[11] Patent Number: 5,966,375
[45] Date of Patent: *Oct. 12, 1999

[54] METHOD AND APPARATUS FOR RADIO COMMUNICATION WITH CONTROL ACCORDING TO PRIORITY OF DATA TO BE TRANSMITTED

[75] Inventor: Naoto Kagaya, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/490,738

[22] Filed: Jun. 15, 1995

[30] Foreign Application Priority Data

Jun. 20, 1994 [JP] Japan .................................. 6-136957
May 24, 1995 [JP] Japan .................................. 7-124916

[51] Int. Cl.$^6$ ................................................ H04L 12/413
[52] U.S. Cl. ........................ 370/338; 370/347; 370/477; 375/222
[58] Field of Search .................................. 370/321, 337, 370/445, 447, 448, 455, 461, 462, 463, 338, 347; 375/200, 202, 205, 206; 340/825.5, 825.05

[56] References Cited

U.S. PATENT DOCUMENTS

| | | | |
|---|---|---|---|
| 4,584,679 | 4/1986 | Livingston et al. | 370/448 |
| 4,661,902 | 4/1987 | Hochsprung et al. | 370/445 |
| 5,003,552 | 3/1991 | Mower | 375/206 |
| 5,042,083 | 8/1991 | Ichikawa | 370/447 |
| 5,329,531 | 7/1994 | Diepstraten et al. | 370/347 |
| 5,353,287 | 10/1994 | Kuddes et al. | 370/448 |
| 5,369,639 | 11/1994 | Kamerman et al. | 370/448 |
| 5,504,750 | 4/1996 | Fulghum et al. | 375/202 |
| 5,533,025 | 7/1996 | Fleek et al. | 375/202 |
| 5,592,483 | 1/1997 | Hieda et al. | 370/445 |

*Primary Examiner*—Chau Nguyen
*Attorney, Agent, or Firm*—Fitzpatrick, Cella, Harper & Scinto

[57] ABSTRACT

Radio communication method and apparatus that performs communication as follows. When a radio communication apparatus receives data transmitted by data terminal equipment, the radio communication apparatus identifies the type of the data, and checks whether another data terminal equipment is transmitting data by detecting a carrier. If no carrier is detected, the radio communication apparatus monitors occurrence of a carrier for a time period determined depending on the priority of data to be transmitted. After elapse of the above time period, it is determined whether another data terminal equipment is transmitting a carrier indicating intention to start data transmission. If it is concluded that no such a carrier is detected, the radio communication apparatus transmits a carrier a predetermined number of times, and then starts data transmission. This technique allows data having a high priority to be transmitted earlier than low-priority data.

52 Claims, 24 Drawing Sheets

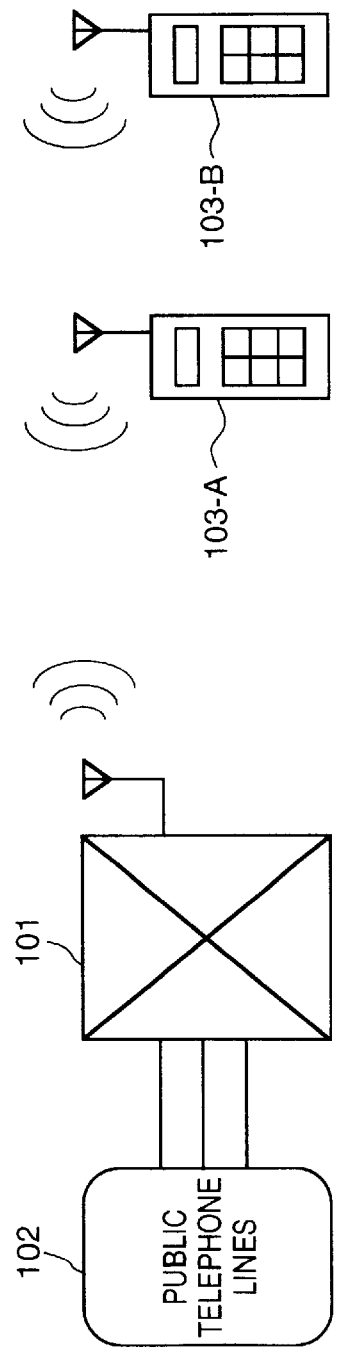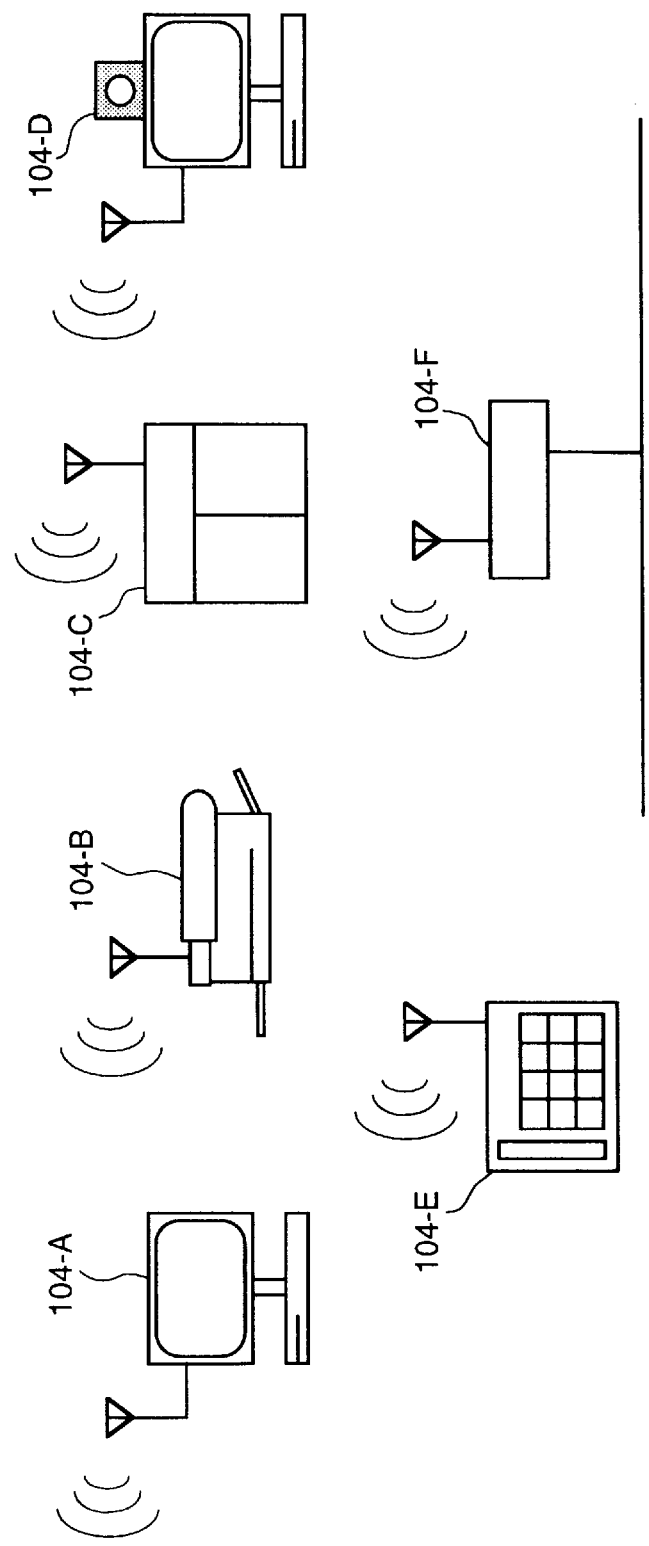

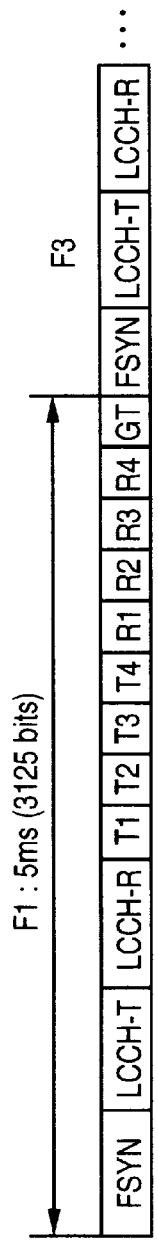
F I G. 12
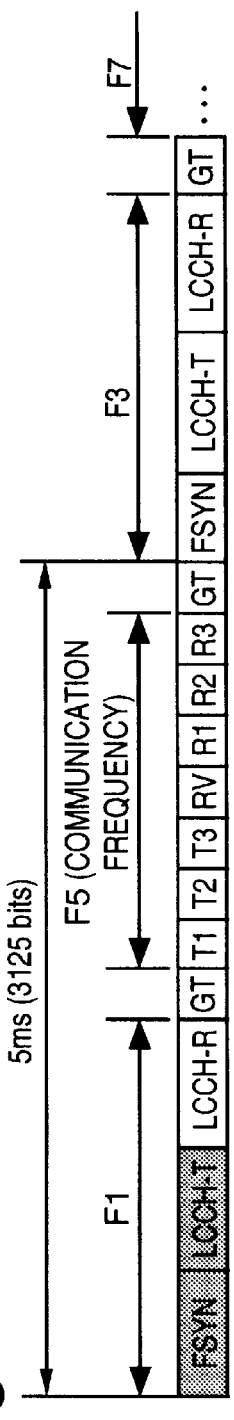
F I G. 13
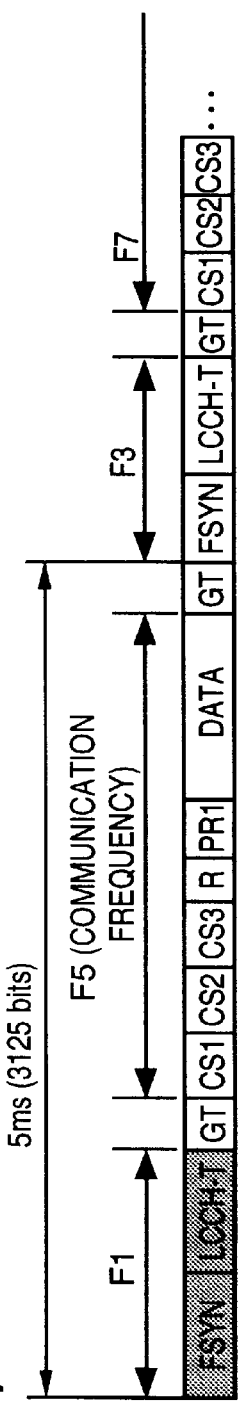
F I G. 14

FIG. 15

| PRO | SYN | ID | FI | TS | NFR |
|---|---|---|---|---|---|
| 62 | 31 | 63 | 2 | 8 | 8 |

FIG. 16

| R | PRI | UW | D | B | GT |
|---|---|---|---|---|---|
| 6 | 62 | 8 | 16 | 160 | 20 |

FIG. 17

| UW | LCCH | GT |
|---|---|---|
| 8 | 160 | 20 |

FIG. 18

| R | PRI | UW | LCCH | GT |
|---|---|---|---|---|
| 6 | 62 | 8 | 160 | 20 |

METHOD AND APPARATUS FOR RADIO COMMUNICATION WITH CONTROL ACCORDING TO PRIORITY OF DATA TO BE TRANSMITTED

BACKGROUND OF THE INVENTION

Field of the Invention

The present invention relates to a radio communication method and apparatus capable of being connected to various types of data terminal equipment.

With the recent great advance in computer and information processing technology, many personal computers come to have the capability of communication with other computers or information processing systems. For such communication, media such as ISDNs (integrated services digital networks) or LANs (local area networks) are now widely available.

Various radio communication systems have been developed to satisfy a need for mobile communication capability or a need to realize communication without using troublesome cables. To meet such requirements, radio communication systems using an SS (spread spectrum) technique or an optical beam technique are now in practical use.

When communication is performed via radio waves, there is a possibility that a plurality of terminal equipment start transmission at the same time. In this case, collisions occur among data transmitted by the terminal equipment and thus the data is destroyed without being correctly transmitted to receiving equipment. During a transmitting operation, sending equipment cannot receive any data and thus cannot know whether the transmitted data has been destroyed.

One conventional technique to avoid the above problem is CSMA/CA (carrier sense multiple access with collision avoidance). In this technique, terminal equipment sends a carrier signal serving as a request-to-send signal several times during a collision detection window before starting a transmission operation thereby notifying other terminal equipment of its intention to start transmission of data. The carrier signals are transmitted at random intervals determined by random numbers so as to avoid collision with other terminal equipment. The terminal equipment monitors carrier signals transmitted by other terminal equipment during the collision detection window, and if it is concluded that no other terminal equipment is transmitting a carrier signal indicating a request of starting its data transmission, then the terminal equipment starts its data transmission.

If the terminal equipment detects a carrier transmitted by another terminal equipment during the collision detection window, the terminal equipment transmits a carrier a predetermined number of times and waits for a time period determined by a random number. In a subsequent collision detection window, the terminal equipment transmits a carrier signal so as to notify its intention to start data transmission. In this technique, it is determined whether there is another terminal equipment desiring to start data transmission by detecting a collision of carrier signals, thereby avoiding the collision of data.

The conventional CSMA/CA technique described above, however, has a significant problem that even when some terminal equipment has important data that should be transmitted immediately, the terminal equipment has to wait if another terminal equipment is transmitting a carrier signal indicating its intention to start data transmission.

SUMMARY OF THE INVENTION

It is an object of the present invention to provide a radio communication method and apparatus for transmitting data in a more convenient and flexible manner depending on the priority of the data to be transmitted.

It is another object of the present invention to provide a communication method and apparatus that can prevent a collision between a carrier serving as a request-to-send signal with another carrier by monitoring occurrence of a request-to-send signal transmitted by another communication apparatus for a time since immediately after completion of communication of a certain communication apparatus wherein the above time is determined depending on the priority of data to be transmitted.

It is still another object of the present invention to provide a communication method and apparatus in which the priority of communication is determined depending on whether the communication apparatus is a calling or called apparatus.

Other objects and aspects of the invention will become apparent from the following description of embodiments with reference to the accompanying drawings.

BRIEF DESCRIPTION OF THE DRAWINGS

FIG. 5 is a block diagram of a radio communication system according to a second embodiment of the invention;

FIG. 12 is a schematic representation of a frame structure used for communication between a main communication apparatus and a sub-apparatus of the radio communication system according to the second embodiment of the invention;

FIG. 13 is a schematic representation of a frame structure used for communication between a sub-apparatus and another sub-apparatus of the radio communication system according to the second embodiment of the invention;

FIG. 14 is a schematic representation of a burst data frame structure used in the radio communication system according to the second embodiment of the invention;

FIG. 15 is a schematic representation of synchronizing signals used in the radio communication system according to the second embodiment of the invention;

FIG. 16 is a schematic representation of voice communication channels used in the radio communication system according to the second embodiment of the invention;

FIG. 17 is a schematic representation of logical control channels directed from the main apparatus to radiotelephone equipment in the radio communication system according to the second embodiment of the invention;

FIG. 18 is a schematic representation of logical control channels directed from the main apparatus to radiotelephone equipment in the radio communication system according to the second embodiment of the invention;

DESCRIPTION OF THE PREFERRED EMBODIMENTS

Referring to the accompanying drawings, preferred embodiments according to the present invention are described in detail below.

Figure 1:
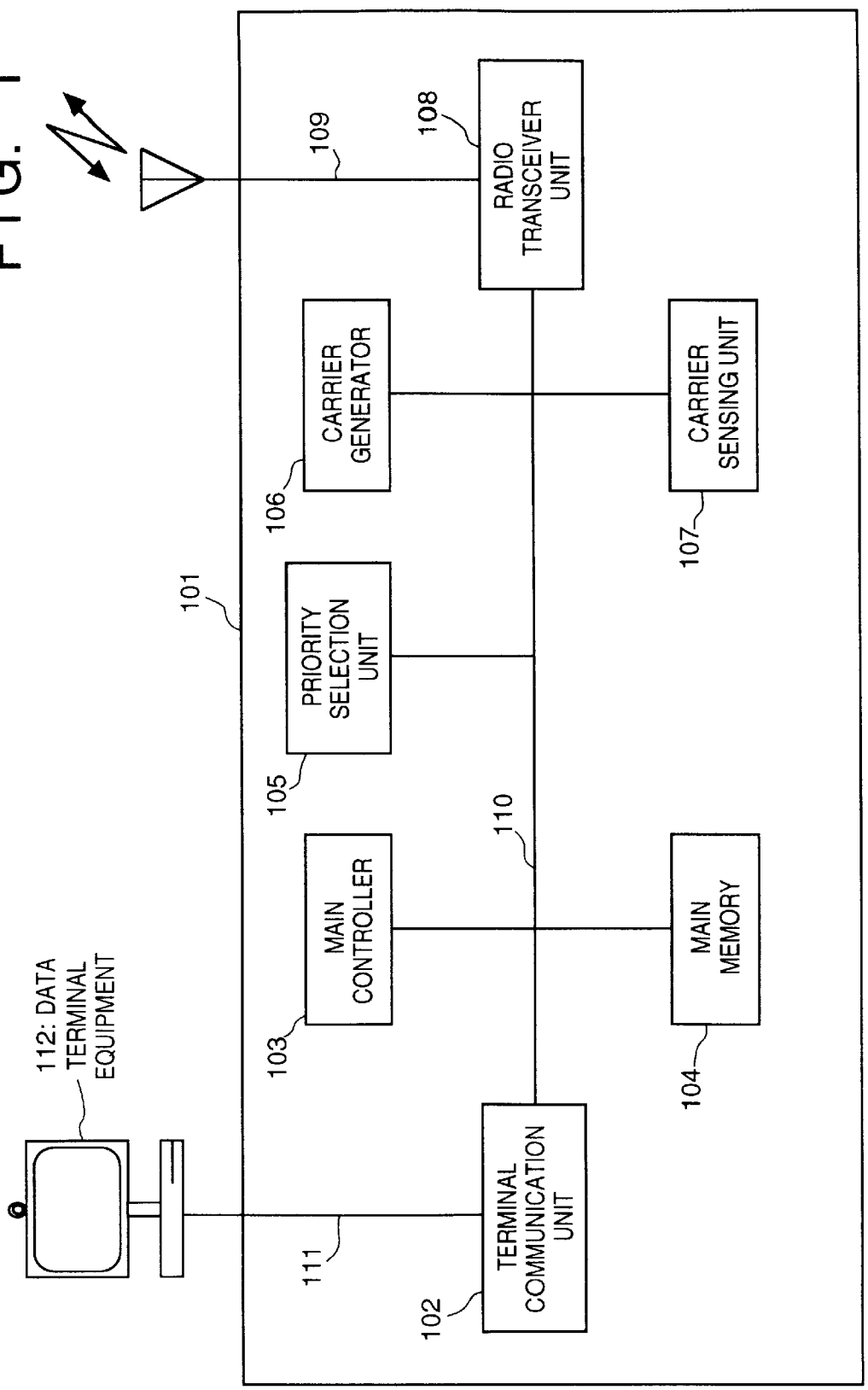
FIG. 1 is a block diagram of a radio communication apparatus according to a first embodiment of the invention.

In this description, it is assumed that radio waves are used as a communication medium whereas other media such as an optical beam may also be used. Thus, in this invention, the term "carrier" is used in a broad sense to describe a carrier such as a radio wave, a light beam, etc, FIG. 1 is a block diagram of a first embodiment of a radio communication system according to the present invention. In FIG. 1, the radio communication apparatus is generally denoted by reference numeral 101. This radio communication apparatus is designed to transmit and receive data according to a radio communication method described later, and includes: a terminal communication unit 102 which communicates with data terminal equipment described later; a main controller 103 responsible for control over the entire communication apparatus wherein the control is performed in accordance with a procedure (a program) stored in a main memory described later; the main memory 104 for storing various control data such as that shown in the flow chart in FIG. 4; a priority selection unit 105 for selecting the priority of data to be transmitted by data terminal equipment described later; a carrier generator 106 for generating a carrier signal indicating intention to start data transmission via a radio transceiver unit which will be described later; a carrier sensing unit 107 for detecting a carrier signal or data transmitted by other data terminal equipment; the radio transceiver unit 108 responsible for transmission and reception of data and carrier signals; an antenna 109 via which data and carrier signals are transmitted and received; an internal bus 110 disposed in the radio communication apparatus 101; a bus 111 such as a LAN, SCSI, or RS232C for connecting the data terminal equipment 112 to the radio communication apparatus 101; the data terminal equipment 112 for generating, displaying, and printing data and also for specifying the priority of data.

The priority of data can be arbitrarily given by a user via the data terminal equipment depending on the type of the data. The assigned priority of the data is identified by the priority selection unit 105.

The radio communication apparatus shown in FIG. 1 operates as follows, whereas in the discussion described below it is assumed that three radio communication apparatus (data terminal equipment A, B, and C, respectively) are in operation.

Figure 2:
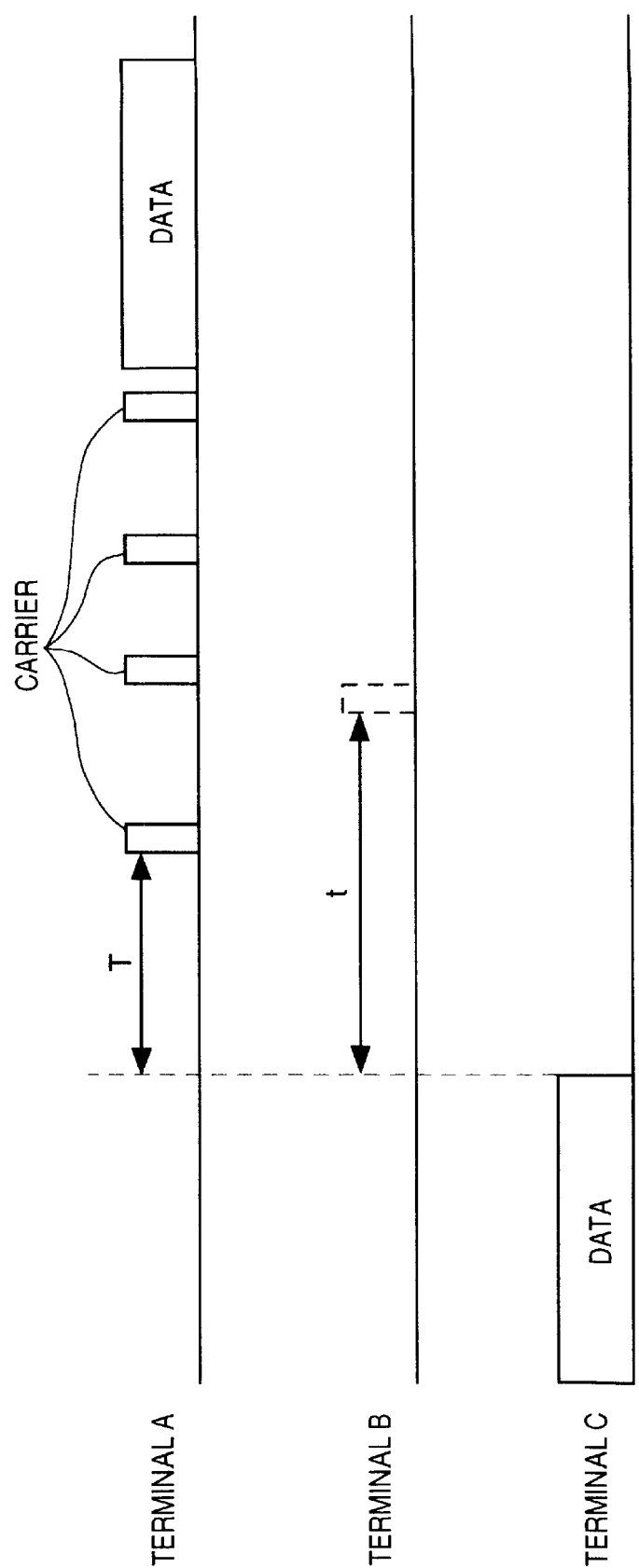
FIG. 2 is a schematic representation of carriers transmitted by a plurality of radio communication data terminal equipment according to the first embodiment of the invention.

FIG. 2 illustrates carriers transmitted by three pieces of data terminal equipment according to the present embodiment of the invention. In this example shown in FIG. 2, after the completion of data transmission of the data terminal equipment C, the data terminal equipment A waits for a time period T and then transmits a carrier signal, whereas the data terminal equipment B transmits a carrier signal after waiting for a time period t (t>T).

When there are a plurality of data terminal equipment that may attempt to transmit a carrier at the same time, the probability of collisions among carriers is reduced by permitting the data terminal equipment to transmit a carrier after waiting for different random amounts of time T or t where in 0<T<t<To.

Figure 3:
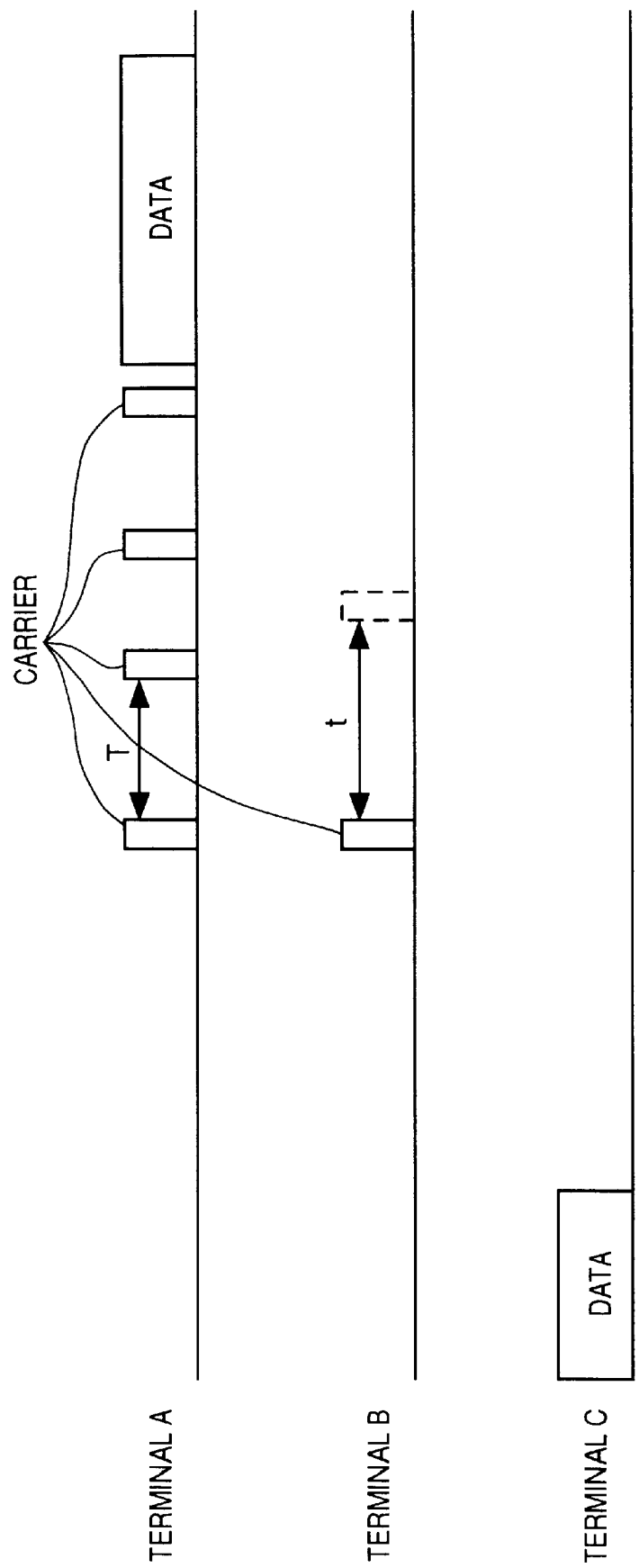
FIG. 3 is a schematic representation of collision of carries transmitted by a plurality of radio communication terminal equipment according to the first embodiment of the invention.

FIG. 3 illustrates a situation in which a collision occurs between one data terminal equipment and another. In this example shown in FIG. 3, carries transmitted by the data terminal equipment A and B collide with each other. The data terminal equipment A is attempting to transmit important data having a high priority. The data terminal equipment B is attempting to transmit data having a lower priority. The data terminal equipment C has transmitted its data.

Figure 4:
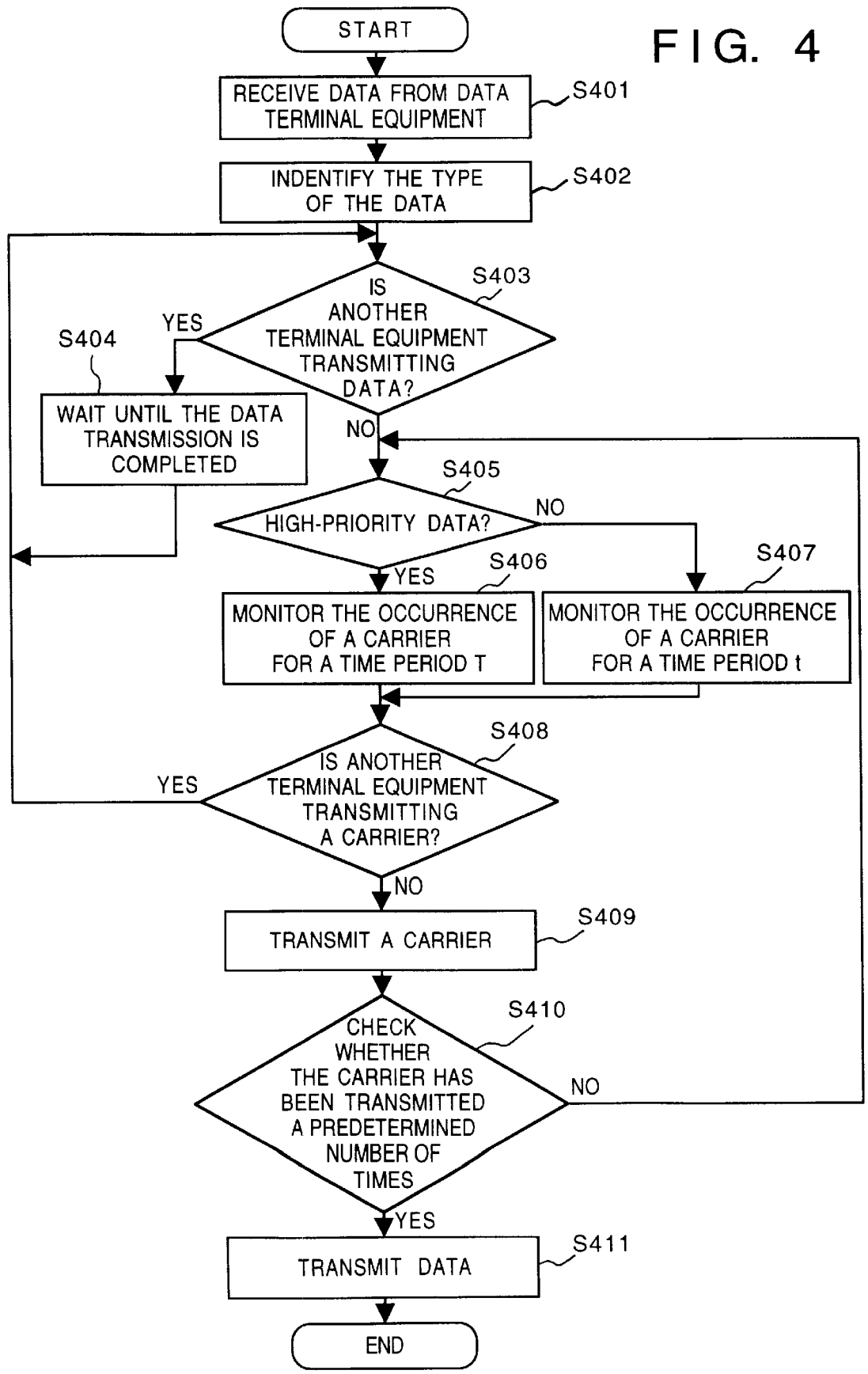
FIG. 4 is a flow chart relating to data transmission performed by the radio communication apparatus according to the first embodiment of the invention.

Referring to the flow chart shown in FIG. 4, the procedure of data transmission according to the present embodiment is described below.

First, in step S401, the radio communication apparatus 101 receives transmission data issued by the data terminal equipment 112 via the internal bus 111. In step S402, the type of the received data is identified. In step S403, the carrier sensing unit 107 checks whether another data terminal equipment is transmitting data. If yes, then the procedure goes to step S404 to wait until the above data transmission is completed. If no carrier is detected, then the procedure goes to step S405 in which it is checked whether the data to be transmitted has a high priority. If the transmission data has a high priority, then the procedure goes to step S406 and waits for a time period T while monitoring the occurrence of a carrier. On the other hand, if it is turned out that the transmission data has a low priority, then the procedure goes to step S407 and waits for a time period t while monitoring the occurrence of a carrier. The time periods T and t are given by individual radio communication apparatus when the radio communication apparatus transmit data wherein the time periods T and t have a random value whereas T is smaller than t.

After elaspse of the time period given in step S406 or S407, the procedure goes to step S408 and determines whether a carrier transmitted by another data terminal equipment has been detected during the above time period. If yes, then the procedure returns to step S403 and repeats the above steps. If no carrier has been detected, the procedure goes to step S409, and transmits a carrier indicating intention to start data transmission. Then in step S410, it is checked whether the carrier has been transmitted a predetermined number of times. If no, the procedure returns to step S405 whereas if the carrier has been transmitted the predetermined number of times, the procedure goes to step S411 and transmits data via the radio transceiver unit 108.

In this embodiment, as described above, after one data terminal equipment has completed data transmission, the time period, for which another data terminal equipment has to wait before transmitting a carrier indicating its intention to start data transmission, is varied depending on the priority of the data to be transmitted so that data having a higher priority is transmitted earlier than other data having a lower priority as shown in FIG. 2. In the example describe above, when the data terminal equipment B having data with a low priority detects a carrier transmitted by the data terminal equipment A having high-priority data, the operation procedure relating to the data terminal equipment B returns to step S403. The data terminal equipment B waits until the data terminal equipment A completes the data transmission and thus the carrier is no longer detected, and then the data terminal equipment B transmits the data. Even when both data terminal equipment A and B transmit carriers at the same time as is the case in FIG. 3, the data terminal equipment A having high-priority data transmits a next carrier earlier than the data terminal equipment B thereby ensuring that the data terminal-equipment A can transmit data earlier than the data terminal equipment B.

In this embodiment, data transmission is performed after transmission of a carrier indicating intention to start data transmission. However, the present invention may also be applied to a communication apparatus in which data is directly transmitted without transmitting a preceding carrier. In this case, the waiting time before starting data transmission is varied depending on the priority of the data to be transmitted.

Furthermore, in this embodiment described above, the priority of data to be transmitted is given by a user via data terminal equipment. Alternatively, the priority of data may be assigned depending on the type of data or the type of the data terminal equipment. The priority may also be predefined for each data terminal equipment.

In a second embodiment described below, digital radio communication by means of a frequency hopping technique is applied to communication over internal lines via a private branch exchange system.

General System Configuration

FIG. 5 illustrates the configuration of a system according to the present embodiment of the invention.

The system includes: an exchange 101 having switching and radio communication capabilities wherein the exchange 101 is connected to a public telephone network; a plurality of radiotelephones 103-A and 103-B designed for exclusive use in communication of voice and control data with the exchange 101; and a plurality of data terminal equipment 104-A through 104-F used in communication of control data with the exchange as well as direct communication of data with another data terminal equipment. In this embodiment, the term "data terminal equipment" is used to broadly describe such equipment capable of transmitting a burst of an arbitrary amount of data to a main apparatus via a radio communication medium, and thus the data terminal equipment includes a computer 104-A, printer 104-B, copying machine, 104-C, television conference terminal equipment 104-D, facsimile machine 104-E, LAN bridge 104-F, and other types of data processing apparatus such as an electronic camera, video camera, scanner, etc.

A distinctive feature of the system is that these radiotelephones and various data terminal equipment not only can communicate with each other but also can access a public telephone network as will be described in detail below.

Configuration of the Main Apparatus

The configuration of the main apparatus connected to the public telephone network is described first.

Figure 6:
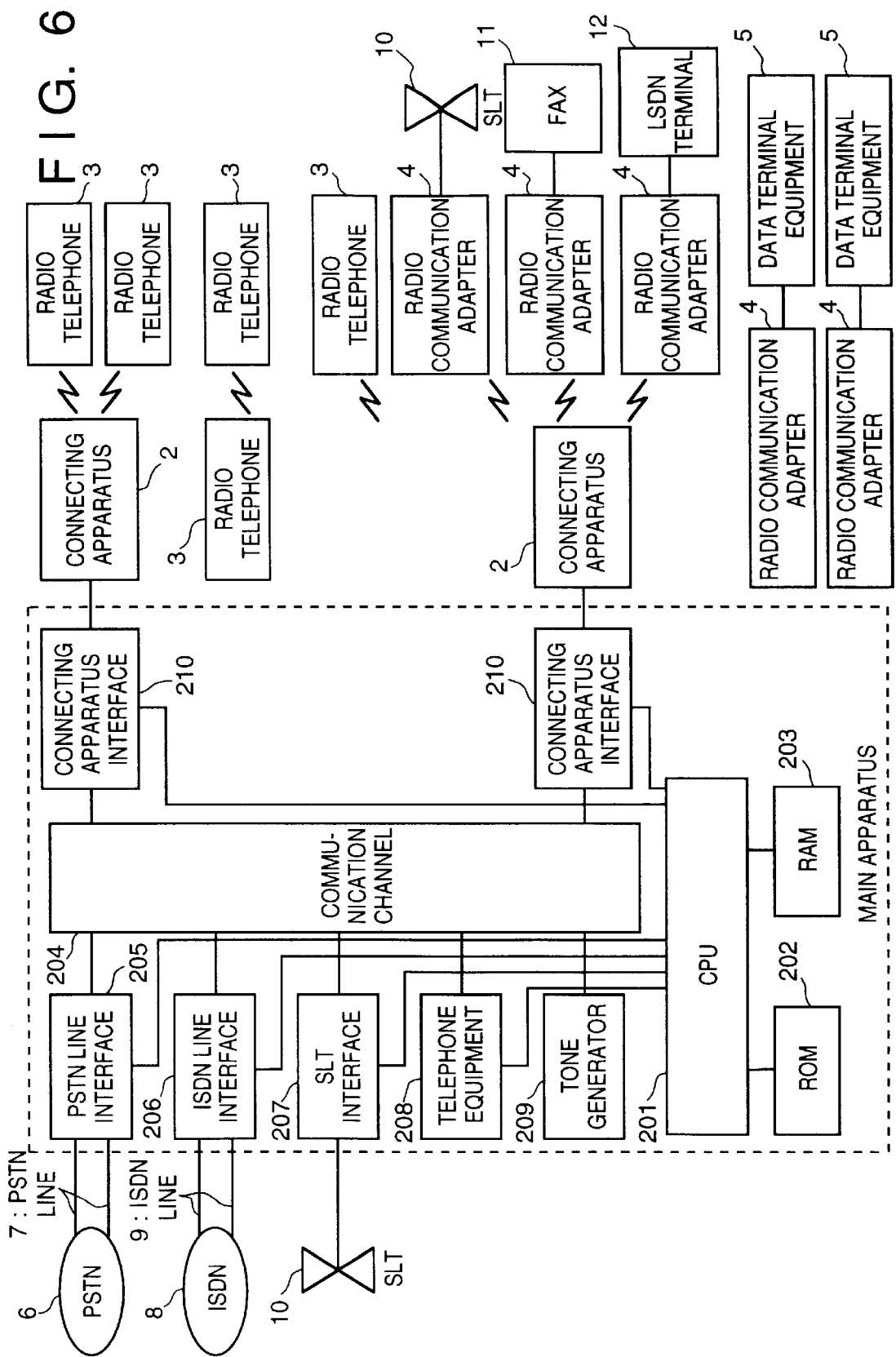
FIG. 6 is a block diagram of a main apparatus of the radio communication system according to the second embodiment of the invention.

FIG. 6 illustrates the configuration of the system according to the present-embodiment. The system includes: a main apparatus 1 that is connected to a plurality of terminal equipment as well as a plurality of external lines so that calls are exchanged among them via the main apparatus 1; a connecting apparatus 2 that operates under the control of the main apparatus to establish radio transmission lines via which radio terminal equipment (such as radiotelephones and data terminal equipment provided with a radio communication adapter described later) is connected to the system; radiotelephones 3 capable of accessing the external lines connected to the main apparatus via the connecting apparatus 2 and also capable of communicating with other radiotelephones 3; radio communication adapters 4 attached to data terminal equipment 5 such as personal computers and printers an SLT 10, a facsimile machine 11, ISDN terminal equipment 12 so that data communication can be made among these terminals; a PSTN (public switched telephone network) 6 serving as one of the external networks connected to the main apparatus 1; PSTN lines 7 serving as external lines for connecting the main apparatus 1 to the PSTN 6; an ISDN 8 serving as one of the external networks connected to the main apparatus 1; ISDN lines 9 serving as external lines for connecting the main apparatus 1 to the ISDN 8; and SLTs 10 serving as one of the terminal equipment connected to the main apparatus 1.

The main apparatus 1 is configured as follows. The main apparatus 1 includes: a CPU 201 that is a main part of the main apparatus 1 and is responsible for control of the entire apparatus including the control of the exchanging operation; a ROM 202 for storing a control program the operation of the CPU 201 is based on; a RAM 203 for storing various data used in the operation of the CPU 201 and also providing a work area required in various operations; a communication channel 204 via which various calls are exchanged (in a time-sharing fashion) under the control of the CPU 201; a PSTN line interface 205 that, under the control of the CPU 201, performs PSTN line control including detection of incoming calls, transmission of selection signal, and closing of a DC loop so as to connect the main apparatus 1 to the PSTN lines; an ISDN line interface 206 that, under the control of the CPU 201, performs ISDN line control including support for the ISDN layers 1 and 2 so as to connect the main apparatus 1 to the ISDN lines; a telephone unit 207 including dial keys, a speech circuit, and a display, wherein the telephone unit 207 is adapted to serve as normal telephone equipment when electric power is supplied in a normal manner and serve as an SLT in the case of interruption of service of electric power; a telephone unit 208 including a handset, dial keys, a speech circuit, and a display, wherein the telephone unit 208 is adapted to serve as a radiotelephone for dedicated use of internal connection when electric power is supplied in a normal manner and serve as an SLT in the case of interruption of service of electric power; a tone generator 209 for generating various tones such as a PB (push-button) signal, a dial tone, and a ringback tone; and a connecting apparatus interface 210 that, under the control of the CPU 201, transmits and receives a control signal and communication signal to and from the connecting apparatus 2.

Configuration of the Connecting Apparatus

Figure 7:
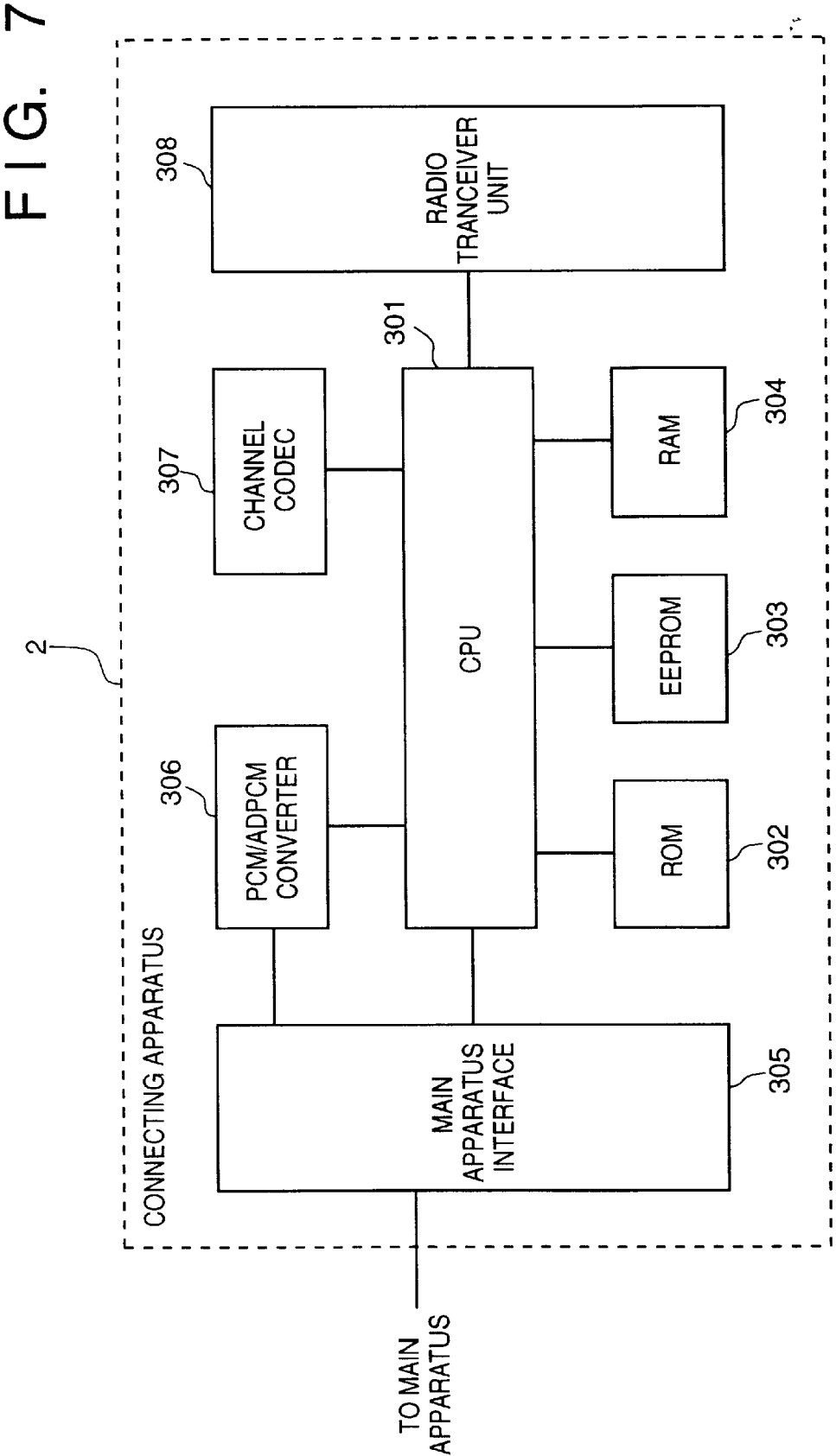
FIG. 7 is a block diagram of a connecting apparatus used in the radio communication system according to the second embodiment of the invention.

FIG. 7 illustrates the configuration of the connecting apparatus 2. As shown, the connecting apparatus 2 includes: a CPU 301 that is a main part of the connecting apparatus 2 and is responsible for control of the operation of the entire connecting apparatus 2 including the control of the communication channel and the radio transceiver unit; a ROM 302 for storing a control program the operation of the CPU 301 is based on; an EEPROM 303 for storing a calling code (identification code) of the exchange system; a RAM 304 for storing various data used in the operation of the CPU 301 and also providing a work area required in various operations; a main-apparatus interface 310 that, under the control of the CPU 301, transmits and receives a control signal and communication signal to and from the connecting-apparatus interface of the main apparatus 1. a PCM/ADPCM converter 306 that, under the control of the CPU 301, converts a pulse code modulated (PCM) communication signal received from the main apparatus 1 into an ADPCM (adaptive differential pulse code modulation) signal to send it to a channel codec 307 described later, and that converts an ADPCM communication signal received from the channel codec 307 into a PCM signal to send it to the main apparatus 1; the channel codec 307 that, under the control of the CPU 301, performs scrambling and further time division multiplexing on the ADPCM communication signal and control signal; and a radio transceiver unit 308 that under the control of the CPU 301 modulates a digital signal in the form of a frame received from the channel codec 307 so as to transmit the resultant signal as a radio wave signal via an antenna and that demodulates a signal received via the antenna into a digital signal in the form of a frame.)

Configuration of Radiotelephone Equipment

Figure 8:
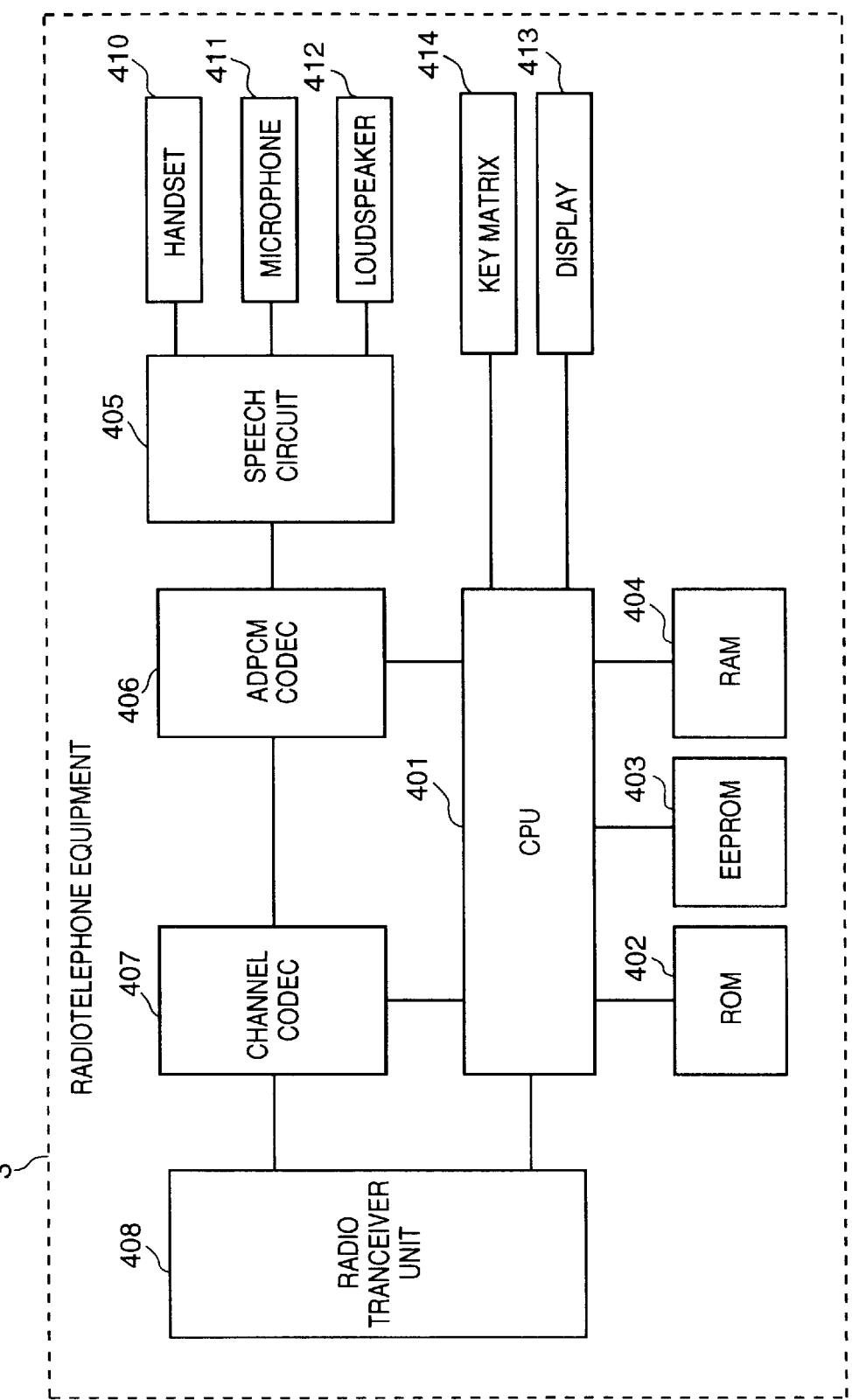
FIG. 8 is a block diagram of radiotelephone equipment used in the radio communication system according to the second embodiment of the invention.

FIG. 8 illustrates the configuration of the radiotelephone 3. As shown, the radiotelephone 3 includes: a CPU 401 that is a main part of the radiotelephone 3 and is responsible for control of the operation of the entire radiotelephone 3 including the control of communication; a ROM 402 for storing a control program the operation of the CPU 401 is based on; an EEPROM 403 for storing a calling code (identification code) of the exchange system as well as a sub-identification code of the radiotelephone; a RAM 404 for storing various data used in the operation of the CPU 401 and also providing a work area required in various operations; a speech circuit 405 that inputs and outputs, under the control of the CPU 401, a voice signal from and to a handset 410, a microphone 411, and a loudspeaker 412 described later; an ADPCM codec 406 that, under the control of the CPU 401, converts an analog voice signal received via the speech circuit 405 into an ADPCM signal to send it to a channel codec 407 described later, and that converts an ADPCM voice signal received from the channel codec 407 into an analog voice signal to send it to the voice interface circuit 405; a channel codec 407 that, under the control of the CPU 401, performs scrambling and further time division multiplexing on the ADPCM voice signal and control signal thereby generating a scrambled and time division multiplexed signal in the form of a frame; a radio transceiver unit 408 that under the control of the CPU 401 modulates a digital signal in the form of a frame received from the channel codec 407 so as to transmit the resultant signal as a radio wave signal via the antenna and that demodulates a signal received via the antenna into a digital signal in the form of a frame; a handset 410 for inputting and outputting a voice signal; a microphone 411 for inputting a voice signal; a loudspeaker 412 for outputting a voice signal in an audible manner; a display 413 for displaying various information such as a dialing number input via a key array described later and the status of the external lines; and the key array including dial keys for inputting a dialing number or other information and function keys such as an external key, hold key, and loudspeaker key.

Configuration of Radio Communication Adapter

Figure 9:
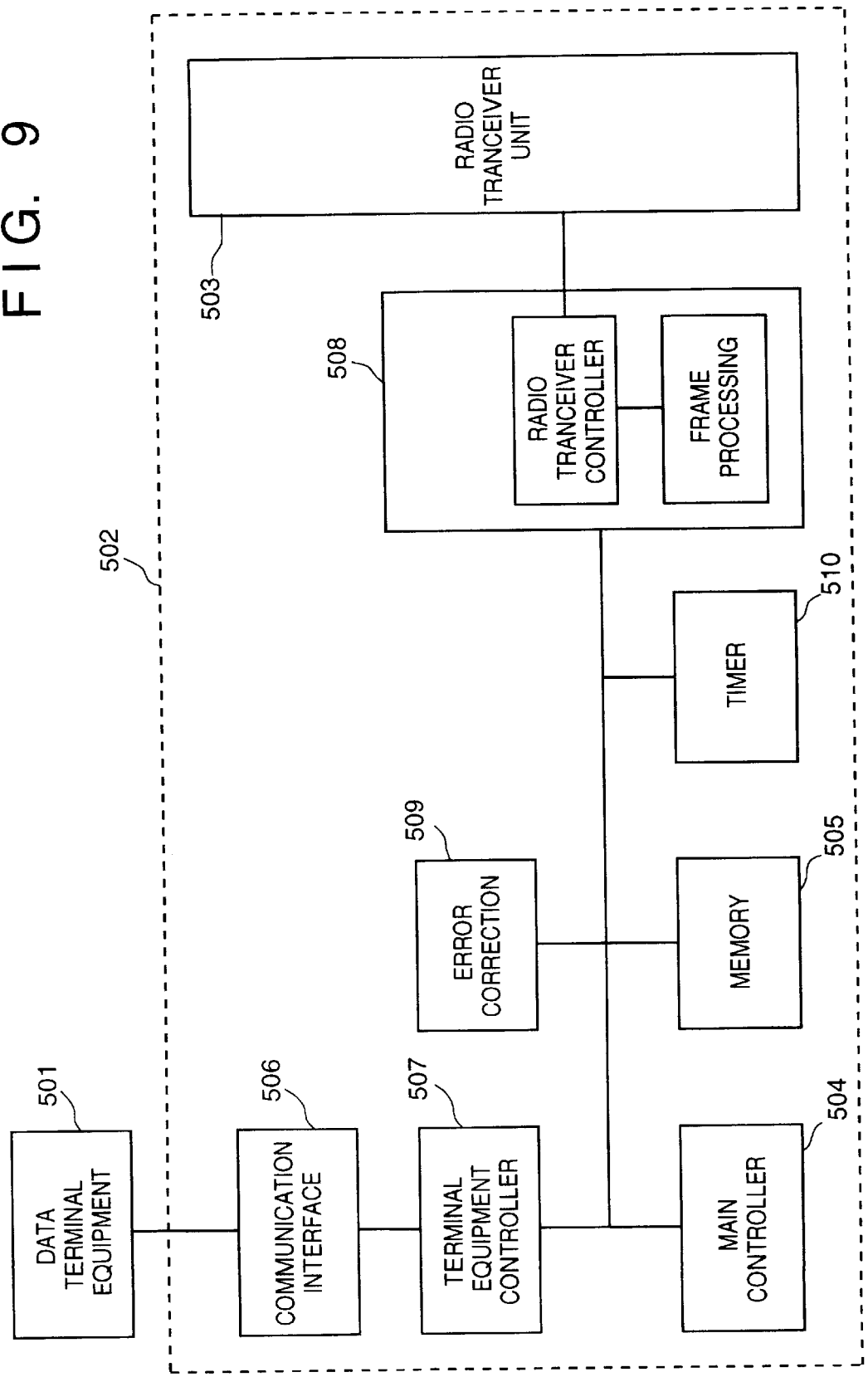
FIG. 9 is a block diagram of a radio communication adapter used in the radio communication system according to the second embodiment of the invention.

FIG. 9 illustrates the configuration of data terminal equipment 501 used in the system as well as the configuration of a radio communication adapter 502 connected to the data communication terminal. The term "data terminal equipment" is used here to broadly refer to data terminal equipment connected via a communication cable or an internal bus to the radio communication adapter 502, such as a personal computer, work station, printer, facsimile equipment, etc.

Figure 19:
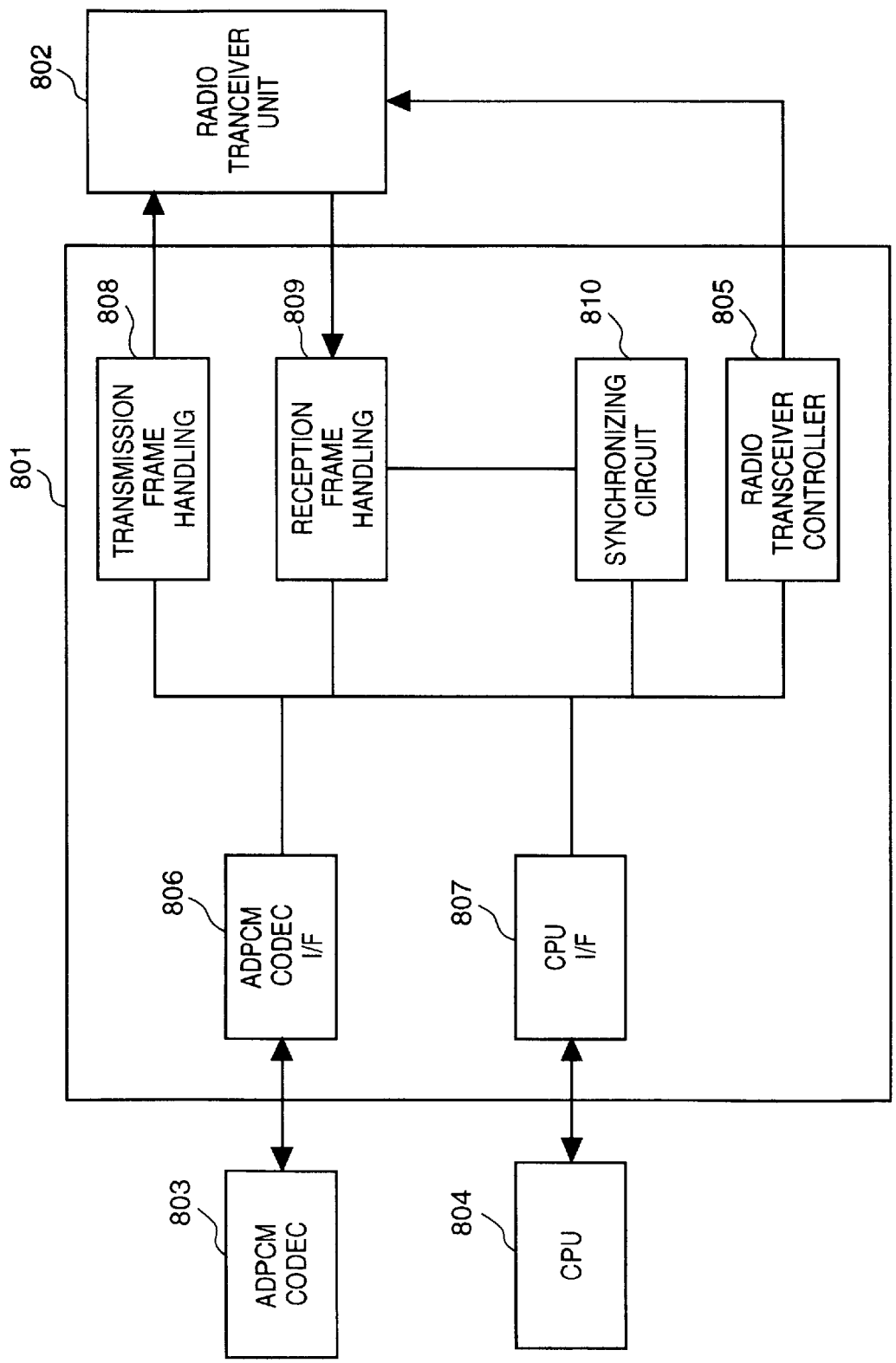
FIG. 19 is a schematic representation of a channel codec used in the radio communication system according to the second embodiment of the invention.

As shown in FIG. 9, the radio communication adapter 502 includes: a radio transceiver unit 503;

a main controller 504 responsible for control of various blocks in the radio communication adapter 502 wherein the main controller 504 includes a CPU and peripheral devices such as an interrupt control device, DMA (direct memory access) control device, etc.;

a memory 505 including a ROM for storing a control program the operation of the CPU 401 is based on, and also including a RAM serving as a buffer area used in various operations;

a communication interface 506 such as an RS232C interface, Centronics interface, LAN interface, or computer internal bus interface such as an ISA bus interface, or PCMCIS interface, that is usually included as a standard communication interface in the data terminal equipment 501;

terminal equipment controller 507 for controlling data communication performed between the data terminal equipment 501 and the radio communication adapter 502 via the communication interface 506;

a channel codec 508 for performing frame processing and control regarding radio communication wherein the channel codec 508 is configured as shown in FIG. 19 in such a manner as to transmit data assembled into a frame to the main apparatus or other terminal equipment via the radio transceiver unit;

an error correction processing unit 509 for reducing bit errors that may occur in data during radio communication wherein error correction codes are inserted in data before transmitting the data and, at a receiving side, the received data is processed to detect error positions and error patterns thereby correcting the bit errors; and a timer 510 which provides a timing signal for controlling the operations of various blocks in the radio communication adapter.

Figure 10:
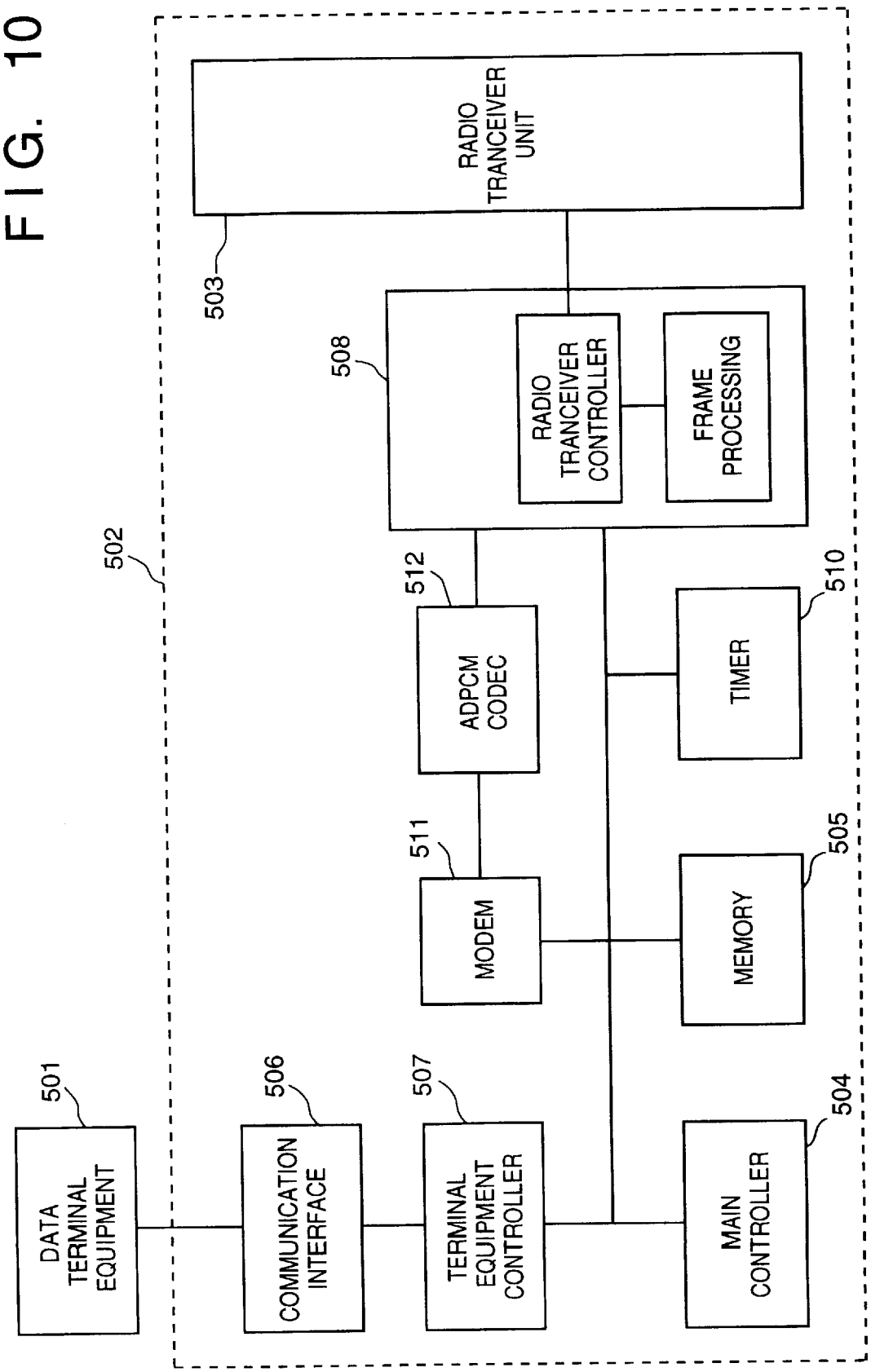
FIG. 10 is a block diagram of a radio communication adapter provided with a built-in modem used in the radio communication system according to the second embodiment of the invention.

FIG. 10 illustrates another type of radio communication adapter having a built-in modem used to transmit data over the public telephone lines. The modem 511 modulates data to be transmitted into a signal in an audio frequency band. An ADPCM codec 512 encodes the signal modulated by the modem. The ADPCM coded data is assembled into a frame by a channel codec and the transmitted to the main apparatus via a radio transceiver unit.

Configuration of Radio Transceiver Unit

Figure 11:
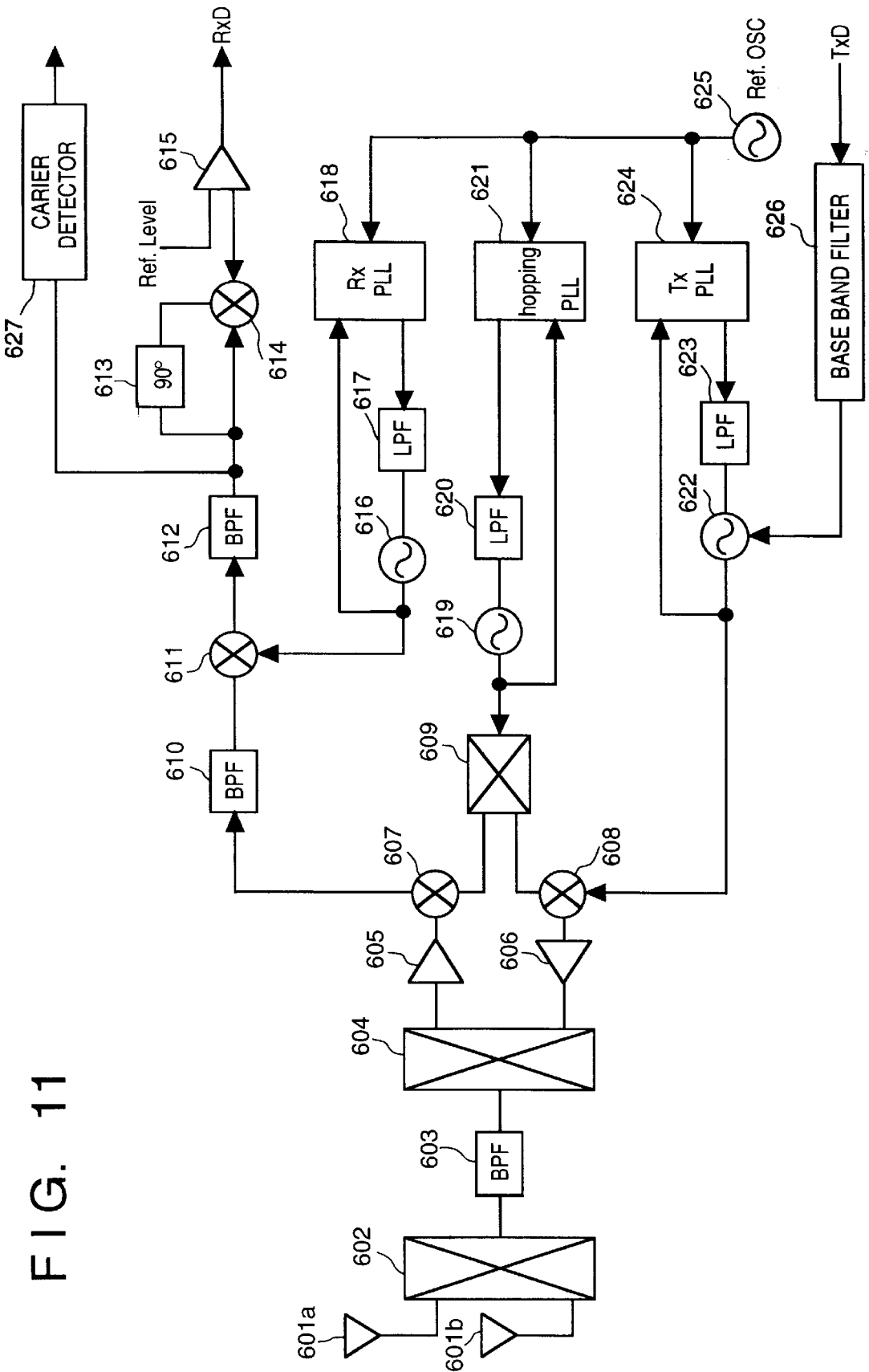
FIG. 11 is a block diagram of a radio transceiver unit used in the radio communication system according to the second embodiment of the invention.

FIG. 11 illustrates the configuration of a radio transceiver unit that can be used in various equipment of the system, such as the main apparatus, radiotelephone equipment, data terminal equipment, etc. As shown, the radio transceiver unit includes:

transmitting and receiving antennas 601a and 601b;

a switch 602 for switching the antennas 601;

an amplifier 605 in a receiving section;

an amplifier 606 (having power control capability) in a transmitting section;

a down-converter 607 for converting a received signal into a first intermediate frequency signal;

an up-converter 608;

a switch 609 for switching the operation between transmission and reception modes;

a BPF for removing signal components having undesirable frequencies from the down-converted signal given by the down-converter 607;

a down-converter 611 for converting the signal into a second intermediate frequency signal so that the receiving section including two down-converters 607 and 611 operates according to the double-conversion receiving technique;

a BPF used at the second intermediate frequency;

a 90° phase shifter 613;

a quadrature detector 614 for detecting or demodulating the received signal applied to the quadrature detector 614 via the BPF 612 and the phase shifter 613;

a comparator 615 acting as a waveform shaping circuit;

a voltage-controlled oscillator (VCO) 616 in the receiving section;

a low-pass filter (LPF) 617;

a PLL (phase-locked loop) 618 including a programmable counter, a prescaler, and a phase comparator wherein a frequency synthesizer is formed by the VCO 616, the LPF 617, and the PLL;

a VCO 619 for generating a carrier signal;

a PLL 620;

a PLL 621 including a programmable counter, a prescaler, and a phase comparator wherein a hopping frequency synthesizer is formed by the VCO 619, the PLL 620, and the PLL 621;

a VCO 622 in the transmitting section wherein the VCO is used to generate a modulated signal;

a LPF 623;

a PLL 624 including a programmable counter, a prescaler, and a phase comparator wherein a frequency synthesizer for generating a frequency-modulated signal is formed in the transmission section by the VCO 622, the LPF 623, and the PLL 624;

a reference clock 625 for supplying a reference clock signal to PLLs 618, 621, and 624;

a base band filter 626 for exclusively passing data to be transmitted (base band signal); and a carrier detector 627 for detecting a request-to-send carrier signal included in the received signal.

The operation of the radio transceiver unit is described in detail below.

1. Transmitting Operation

Data (digital data) supplied from an external circuit such as a processor is applied to the base band filter 626 and base band components are extracted. The extracted base band signal is applied to the modulation terminal of the VCO 622 in the transmission section.

The VCO 622 generates a signal having a frequency corresponding to the control voltage supplied by the PLL 624 in the transmitting section via the LPF 623, thereby directly generating a modulated signal at the intermediate frequency.

The modulated signal having the intermediate frequency, which has been generated by the frequency synthesizer formed by the elements 622, 623 and 624, is applied to the up-converter 608 and thus mixed with the carrier signal generated by the frequency synthesizer formed by the VCO 619, the LPF 620 and the hopping PLL 621. The output of the up-converter 608 is applied to the amplifier 606 in the transmission section.

The signal amplified to a predetermined level by the amplifier 606 in the transmission section is applied to the BPF 603, and unnecessary frequency components included in the signal are removed. The output of the BPF 603 is then radiated as a radio wave into space via the antenna 601.

2. Receiving Operation

The signal received via the antenna 601 is applied to the BPF 603 to remove components at unnecessary frequencies. The signal is then amplified to a predetermined level by the amplifier 605 in the receiving section.

The amplified signal is then applied to the down-converter 607. The down-converter 607 converts the received signal to a first intermediate frequency signal. In this down-conversion operation, the carrier signal is removed from the received signal.

The first intermediate frequency signal is applied to the BPF 610 and components at unnecessary frequencies are removed. The output of the BPF 610 is applied to the down-converter 611.

The down-converter 611 generates a second intermediate frequency signal from the first intermediate frequency signal and the signal generated by the frequency synthesizer formed by the VCO 616, the LPF 617, and the PLL 618 in the receiving section.

The second intermediate frequency signal generated by the down-converter is applied to the BPF 612 to remove unnecessary frequency components. The output of the BPF 612 is then applied to the 90° phase shifter 613 and to the quadrature detector 614.

The quadrature detector 614 performs detection and demodulation using the signal applied via the 90° phase shifter 613 and the original signal directly applied to the quadrature detector 614.

The data (analog data) obtained by the demodulation performed by the quadrature detector 614 is applied to the comparator 615 and subjected to waveform shaping. The resultant signal is output to an external circuit.

The output of the BPF 612 is also applied to the carrier detector 627 so as to detect a carrier signal.

Radio Communication Frame

FIGS. 12 to 18 illustrate the structures of radio frequency frames used in the present system.

In this system, three different frames, a main apparatus/radiotelephone communication frame (hereafter referred to as a PCF), radiotelephone/radiotelephone communication frame (hereafter referred to as a PPF), and burst data frame (hereafter referred to as a BDF), are used as described in detail below.

FIG. 12 illustrates a PCF. In FIG. 12, FSYN denotes a synchronizing signal. LCCH-T is a logical control channel from the main apparatus to a radiotelephone. LCCH-R is a logical control channel from a radiotelephone to the main apparatus. T1, T2, T3, and T4 are voice channels directed to four different radiotelephones. R1, R2, R3, and R4 are voice channels for carrying voice signals originating from four different radiotelephones. GT denotes a guard time. In FIG. 12, F1 and F3 denote frequency channels used to transmit frames on radio waves wherein the frequency channel used is changed from frame to frame.

FIG. 13 denotes a PPF. In FIG. 13, FSYN denotes a synchronizing signal. LCCH-T is a logical control channel from the main apparatus to a radiotelephone. LCCH-R is a logical control channel from a radiotelephone to the main apparatus. T1, T2, and T3 are voice channels directed to three different radiotelephones. R1, R2, and R3 are voice channels for carrying voice signals originating from three different radiotelephones. GT denotes a guard time. In FIG. 13, F1, F3, F5, and F7 denote frequency channels used to transmit frames on radio waves. As opposed to the PCF, after receiving logical control information via the LCCH-T at F1, the frequency channel is changed to a voice channel at F5 assigned to radiotelephone communication so as to perform radiotelephone communication. Then, the frequency channel is changed to F3 to receive logical control information from the main apparatus. The frequency channel is further changed to voice channel at F7 assigned to a radiotelephone channel. The above procedure is repeated until the radiotelephone communication is completed.

FIG. 14 denotes a BDF. FSYN denotes a synchronizing signal. LCCH-T is a logical control channel from the main apparatus to a radiotelephone. GT denotes a guard time. CS1 through CS3 denote time slots to transmit a carrier signal indicating a request for starting transmission. R denotes a time period for sensing a carrier signal thereby detecting completion of a previous frame or checking whether some radiotelephone equipment is transmitting a radio wave. RR1 is a preamble, and DATA denotes a data slot for accommodating burst data. In FIG. 14, F1, F3, F5, and F7 denote frequency channels used to transmit frames on radio waves. In this case, unlike the PCF, after receiving logical control information via the LCCH-T at F1, the frequency channel is changed to a channel at F5 assigned to burst data communication so as to perform radiotelephone communication. Then, the frequency channel is changed to F3 to receive logical control information from the main apparatus. The frequency channel is further changed to a channel at F7 assigned to burst data communication. The above procedure is repeated until the burst data communication is completed.

FIG. 15 denotes an FSYN frame. In FIG. 15, PR denotes a 62 bit preamble for acquisition of frequency synchronization. SYN denotes a 31 bit frame synchronizing signal. ID denotes a 63 bit calling signal. FI is a 2 bit signal indicating the channel type such as PCF, PPF, and BDF. TS carries time slot information, and NSF carries frequency information of a subsequent frame. In FIG. 15, numerals represent how many bits are assigned to the above signals.

FIG. 16 denotes a voice channel frame. Since transmission voice channels T1, T2, T3, and T4 are configured in the same manner, these are generally denoted by Tn. Similarly, reception voice channels R1, R2, R3, and R4 are configured in the same manner, and these are generally denoted by Rn, wherein Rn is configured in the same manner as Tn. In FIG. 16, R denotes a time period for sensing a carrier signal thereby detecting completion of a previous frame or checking whether some radiotelephone equipment is transmitting a radio wave. PR1 denotes a preamble for each slot. UW denotes a unique word including a sub-ID. D denotes a 3.2 kbps signal carrying information regarding a D channel. B denotes a 3.2 kbps signal carrying information regarding a B channel. GT denotes a guard time. In FIG. 16, numerals represent how many bits are assigned to the above signals.

FIG. 17 illustrates the configuration of a logical control channel LCCH-T via which relating control signals are sent from the main apparatus. In FIG. 17, UW denotes a unique word including a sub-ID. LCCH denotes logical control information. GT is a guard time. LCCH-T is transmitted immediately after transmission of FSYN. Therefore, LCCH-T includes no preamble.

FIG. 18 illustrates the frame configuration of a logical control channel LCCH-R via which relating control signals are transmitted from a radiotelephone to the main apparatus. In FIG. 18, R denotes a time period for sensing a carrier signal thereby detecting completion of a previous frame or checking whether some radiotelephone equipment is transmitting a radio wave. PR1 denotes a preamble for each slot. UW denotes a unique word including a sub-ID. LCCH denotes logical control information. GT is a guard time.

Channel Codec

The frames described above are handled by the channel codec. FIG. 19 illustrates the configuration of the channel codec. In FIG. 19, reference numeral 801 denotes a channel codec. 802 denotes a radio transceiver unit. 803 denotes an ADPCM codec installed in radiotelephone equipment or the like. 804 denotes a CPU installed in radiotelephone equipment or a radio communication adapter. The channel codec 801 includes various functional blocks described below. A radio transceiver controller 805 is responsible for control regarding the switching of the operation mode between transmitting and receiving modes as well as the frequency hopping control. The radio transceiver controller 805 also detects a carrier prior to data transmission. A CPU interface 807 has registers for storing information representing status or operation modes of various internal parts of an ASIC. In response to control signals supplied by the CPU as well as status of various parts of the ASIC, the CPU interface 807 controls these parts of the ASIC. An ADPCM codec interface 806 is used to transmit and receive voice signals in the form of serial data as well as synchronizing clock signals to and from the ADPCM. A transmission frame handling unit 808 assembles signals supplied by the ADPCM and logical control data supplied by the CPU into transmission frames shown in FIGS. 12 through 18. A reception frame handling unit 809 extracts control information and voice data from signal frames received from the radio transceiver unit, and transfers the extracted data to the ADPCM codec interface or the CPU interface. A synchronizing circuit 810 consists of a DPL (delay phase locked loop) and extracts a clock signal from a received signal thereby achieving bit synchronization.

The basic operation of this ASIC is described below.

1. Transmission Operation

The channel codec ASIC 801 receives control information to be added to a transmission data frame from the CPU via the CPU interface. In the case where the ASIC is used in a radiotelephone or the connecting apparatus of the main apparatus, the transmission frame handling unit assembles the above-described control information and data received from the ADPCM codec into a transmission frame. On the other hand, when the ASIC is used in data terminal equipment, the transmission frame handling unit assembles the above control information and error-correction-coded burst data into a transmission frame. In the above frame assembling process, the data is scrambled and then assembled into a frame. This scrambling is necessary to achieve a good DC balance in radio transmission. The radio transceiver controller 805 monitors completion of a receiving signal. If completion of a receiving signal is detected, the radio transceiver controller 805 confirms that no carrier is detected, and changes the operation mode of the radio transceiver unit to a transmission mode. Then, the transmission frame is transferred to the radio transceiver controller 805.

2. Receiving Operation

When transmission of data is completed, the radio transceiver controller switches the operation mode of the radio transceiver to a receiving mode and waits for arrival of an incoming frame. If an incoming frame is received, the received data is descrumbled, and control information as well as data is extracted from the received frame. The extracted control information is transferred to the CPU via the CPU interface.

If the received frame is a PCF or PPF, the extracted data is transferred to the ADPCM codec interface. In the case of a radiotelephone, the data is output in the form of voice information via the ADPCM codec. In the case of the main apparatus, the data is transmitted over a transmission channel.

If the received frame is a BDF, the extracted data is transferred to a memory in data terminal equipment.

3. Handling of Logical Control Data 3.1 Waiting State

When the ASIC is in a waiting state at a frequency assigned by the main apparatus, the ASIC receives LCCH-T that is transmitted by the main apparatus at periodic intervals. The LCCH transmitted by the main apparatus includes information regarding whether there is an arrival of an external call, whether some radiotelephone equipment is transmitting a request-to-send signal, and other information. In the case of a radiotelephone, LCCH is extracted by the reception frame handling unit and transferred to the CPU. Then, LCCH to be transmitted to the main apparatus designated by the CPU is transmitted via LCCH-R in the same frame. The radiotelephone performs the above procedure periodically until an incoming or outgoing call occurs.

3.2 Communicating Operation

The communication operation will be described below assuming that the radiotelephone A makes a call. It is further assumed that when the radiotelephone A is in a waiting state, it receives LCCH from the main apparatus via a frequency channel F1. Before making a call, the radiotelephone A monitors LCCH transmitted via the frequency channel F1 by the main apparatus according to the procedure described earlier in paragraph 3.1. When a call occurs at the radiotelephone A, the radiotelephone A transmits LCCH-R including a request-to-send signal to the main apparatus according to the procedure described earlier in paragraph 3.1. 100 msec later, the main system transmits an LCCH signal at the frequency channel F1 to the radiotelephone A. The radiotelephone A determines from the received LCCH signal whether it is possible to start communication.

If it is turned out that the received LCCH signal indicates that the line is busy and thus it is impossible to make connection, the radiotelephone A notifies a user that the line is busy.

In the case where the LCCH signal received from the main system indicates that it is possible to make connection, a time slot in a voice channel to be used in speech communication is also designated by the same LCCH-T signal. For example, if "1" is designated, speech communication is performed using T1 and R1. Then, the speech communication is continued while changing the frequency channel according to the frequency hopping pattern designated by FS and NFR in the FSYN frame. After connected to the main apparatus, control information is received or transmitted from or to the main apparatus via the D channel information in the Tn or Rn frame.

In the case where communication is performed between a radiotelephone and another radiotelephone, control information is transmitted between them via the D channel. When the communication is complete, the radiotelephones transmits control information to the main apparatus using an assigned frequency channel LCCH-R (frequency channel F1 is assigned to the radiotelephone A as a waiting-state frequency channel in this example) to tell that the inter-radiotelephone communication is completed Frequency Hopping Pattern FIG. 20 illustrates the concept of frequency hopping used in this system.

In this system according to the present embodiment, 26 frequency channels each having a frequency bandwidth of 1 MHz distributed in a frequency bandwidth of 26 MHz are used. To handle the case where some frequency channels become unusable owing to for example interfering noise, 20 frequency channels are selected from the above 26 channels and the selected 20 channels are made to hop from channel to channel in a predetermined sequence of channels.

In this system, one frame has a duration of 5 msec, and the frequency channel is made to hop frame by frame. Therefore, each hopping pattern has a period of 100 msec.

Figure 20:
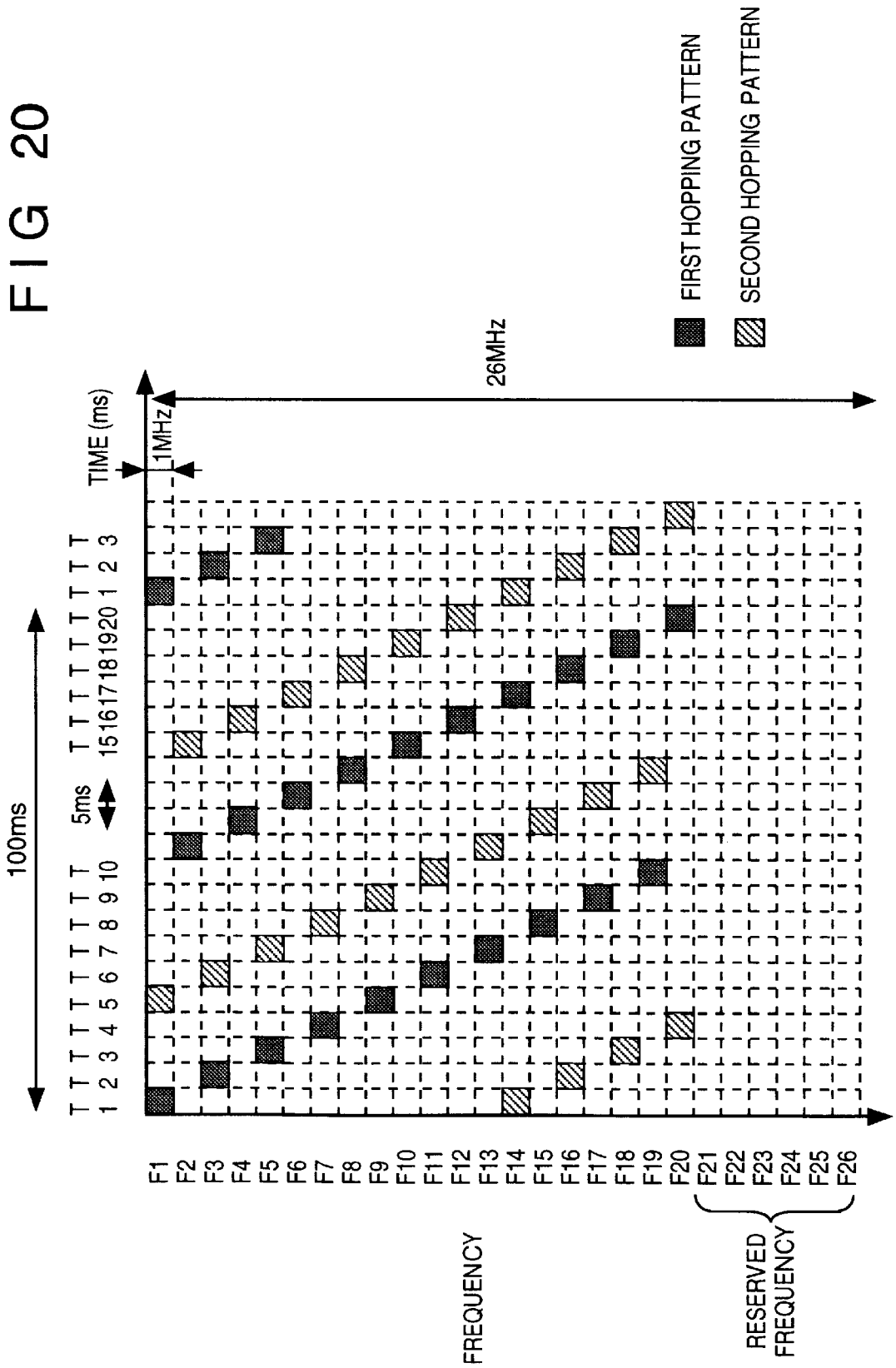
FIG. 20 is a schematic representation of the concept of a frequency hopping technique used in the radio communication system according to the second embodiment of the invention.

In the example in FIG. 20, there are shown two different hopping patterns denoted by different marks. As in this example shown in FIG. 20, the hopping pattern is arranged such that any frequency is used only in one pattern at a time and the same frequency is not used in another pattern at the same time so as to prevent data errors.

In the case where a plurality of connecting apparatus are accommodated in the system, each connecting apparatus uses a different hopping pattern to avoid interference among various connecting apparatus. This technique makes it possible to construct a multi-cell system thereby providing a wider service area.

Detailed Description of the Operation

In this system, as described above, a frame is assembled to perform communication between the main apparatus and a radiotelephone or other data terminal equipment, or between a terminal and another terminal, and the frequency used for communication is switched periodically. The related operations will be described in more detail below.

1. Basic Operation Procedure

In this system, before starting communication via a channel, a slot and a hopping pattern to be used in the communication are determined via logical control channels (LCCH-T and LCCH-R) which are multiplexed in a frame in a time division fashion. To achieve battery savings, each terminal equipment performs intermittent receiving operations in such a manner that each terminal equipment performs transmitting and receiving operations only via a logical control channel at a frequency assigned to that terminal equipment.

At a time immediately after turning on the power of terminal equipment, the terminal equipment has no hopping pattern yet, and the terminal equipment waits for arrival of a frame at an arbitrary frequency. If a first frame is received, the frequency information regarding the subsequent frame is extracted from the first frame, and frequency hopping is started according to the obtained information. In the case where a plurality of connecting apparatus are used, if some connecting apparatus receives a frame first, subsequent connecting apparatus follow the hopping pattern used by the first connecting apparatus.

At a time immediately after turning on the power, it is not determined yet which frequencies are to be assigned to which terminal equipment. Therefore, a setting operation is performed so as to perform registration of ID codes of respective terminal equipment and assignment of logical control channel frequencies.

After the assignment of the logical control channel frequencies, each terminal equipment starts its operation in an intermittent receiving mode so that each terminal equipment receives only logical control data directed to it. If data to be transmitted to the main apparatus is given to some terminal equipment, the terminal equipment transmits the data to the main apparatus using an LCCHR at an assigned frequency.

If the terminal equipment desires to start communication via a communication slot, the terminal equipment tells the main apparatus via the logical control channel that the terminal equipment has a desire to start communication and requests that a slot and a hopping pattern be assigned to the equipment. Once the above assignment has been performed, it becomes possible to perform speech communication or data communication.

Figure 21:
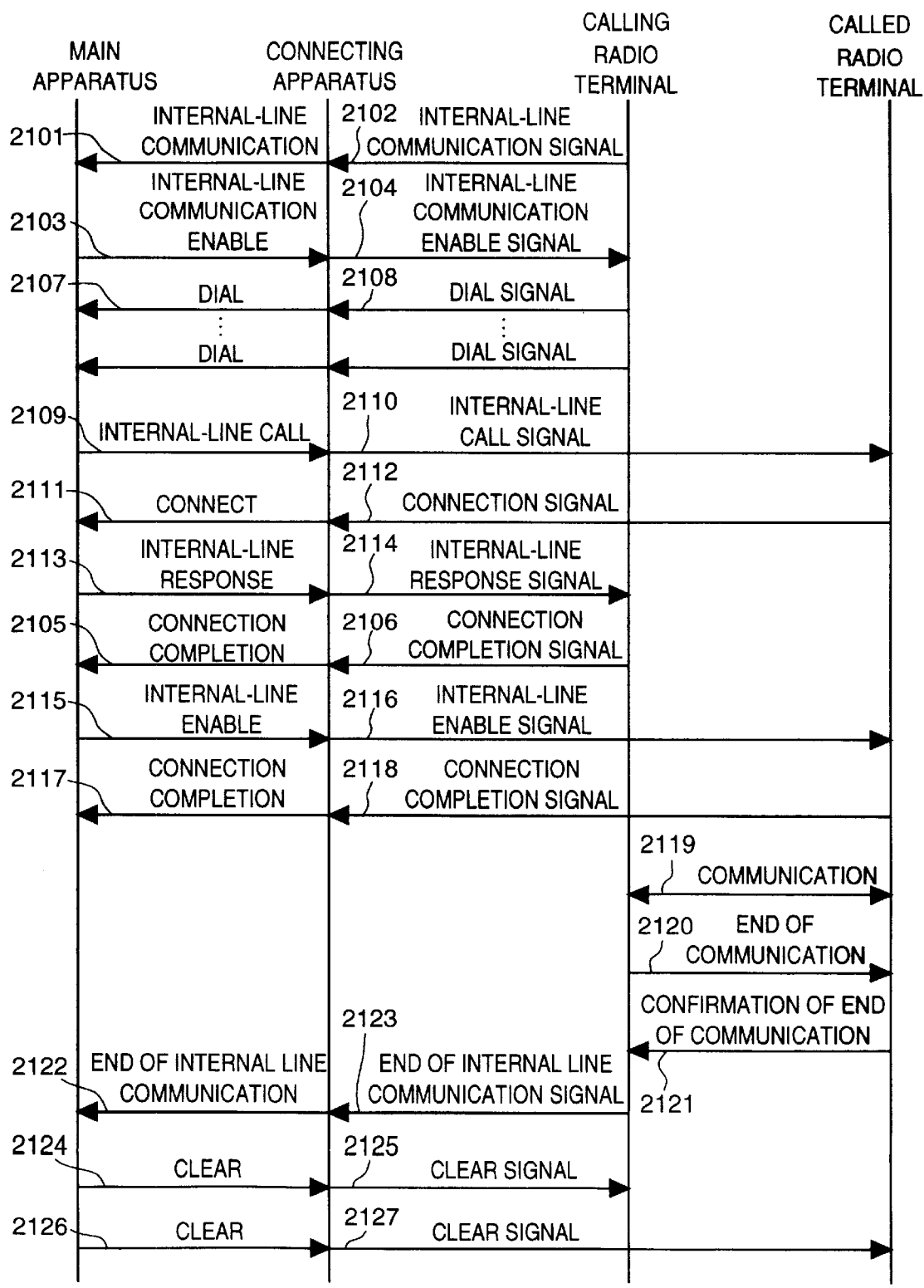
FIG. 21 is a schematic representation of a internal-line communication sequence used in the radio communication system according to the second embodiment of the invention.
Figure 22:
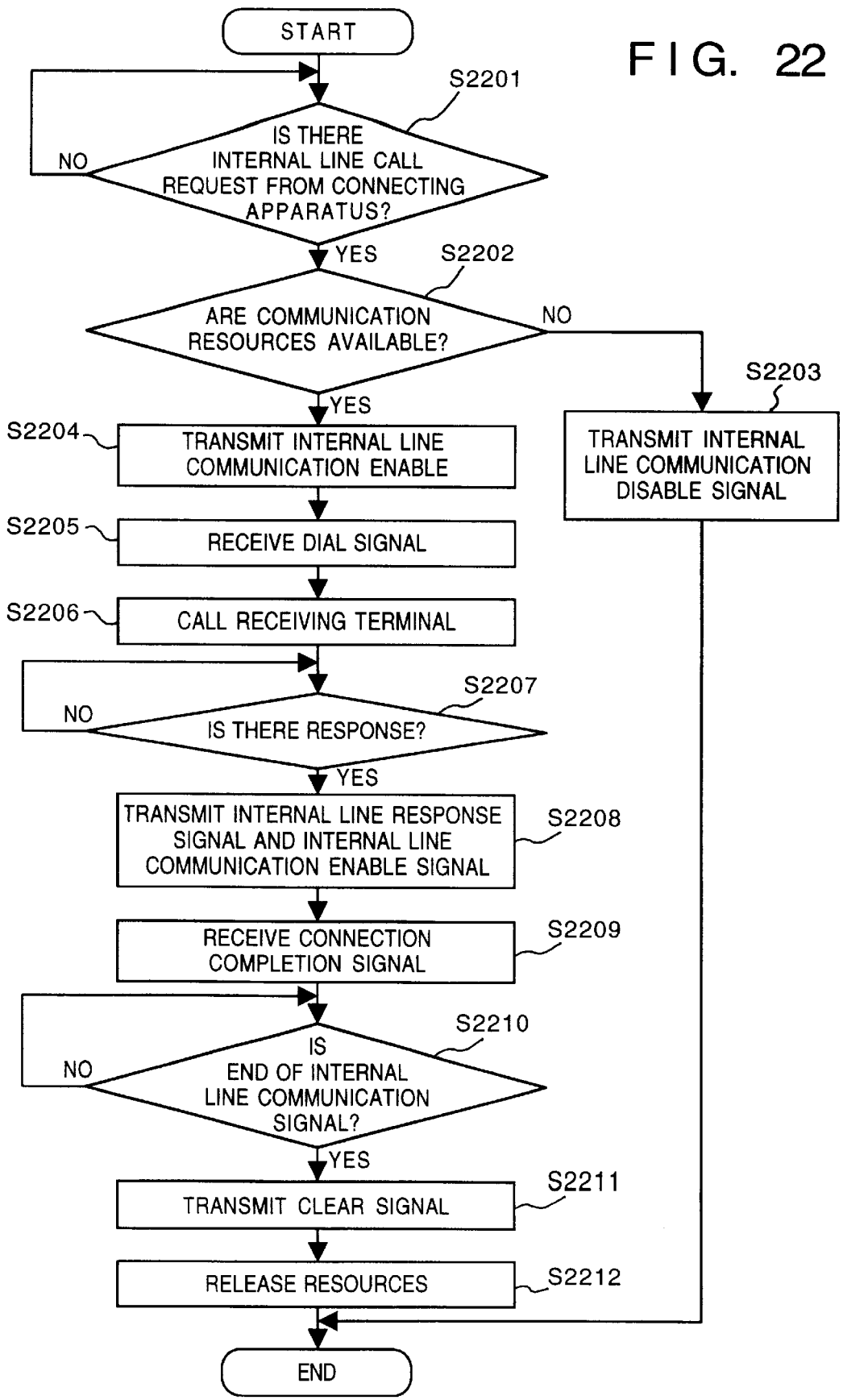
FIG. 22 is a flow chart of an internal-line communication operation relating to the main apparatus of the radio communication system according to the second embodiment of the invention.
Figure 23:
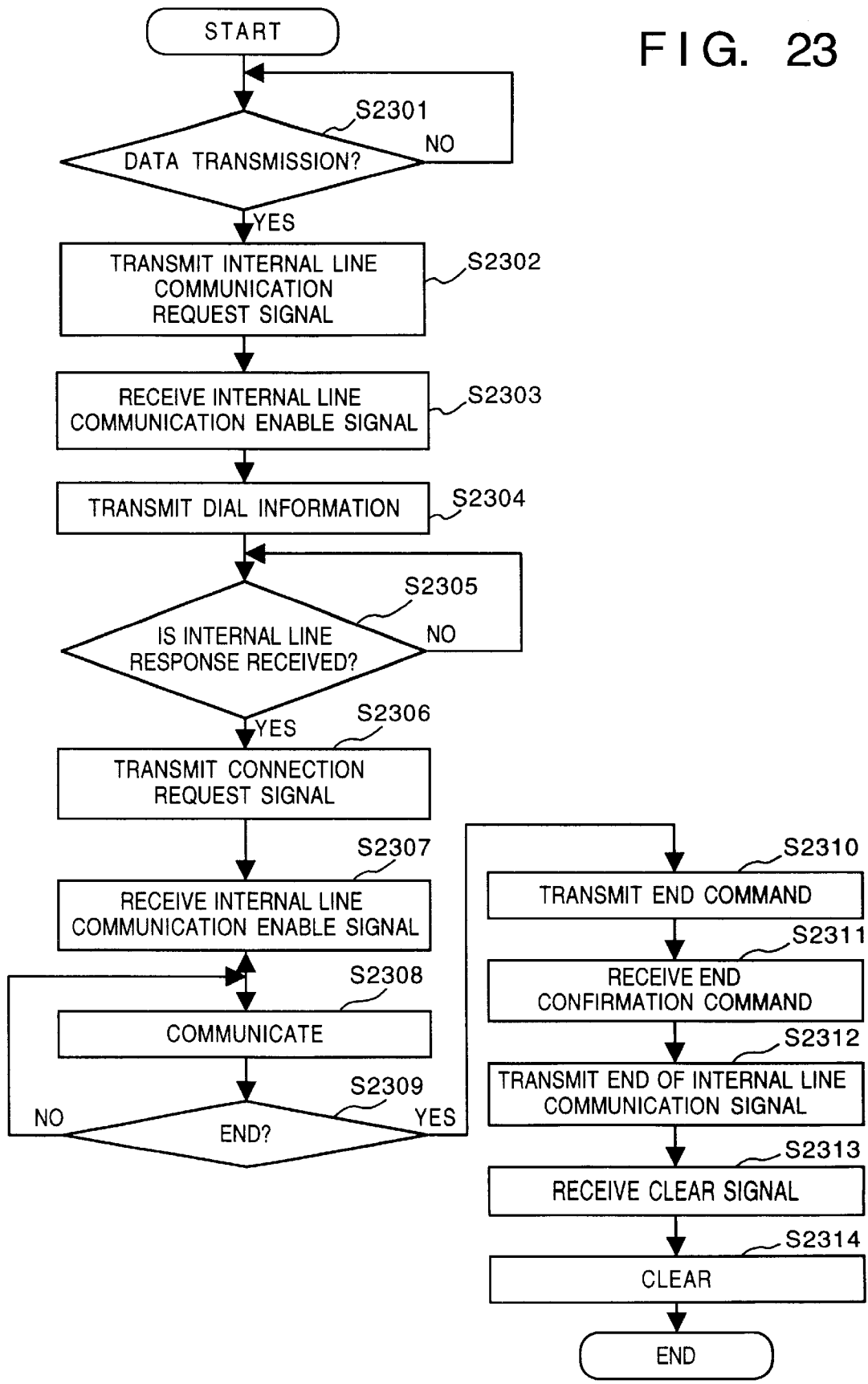
FIG. 23 is a flow chart of an internal-line operation of an outgoing call from radio communication terminal equipment of the radio communication system according to the second embodiment of the invention.
Figure 24:
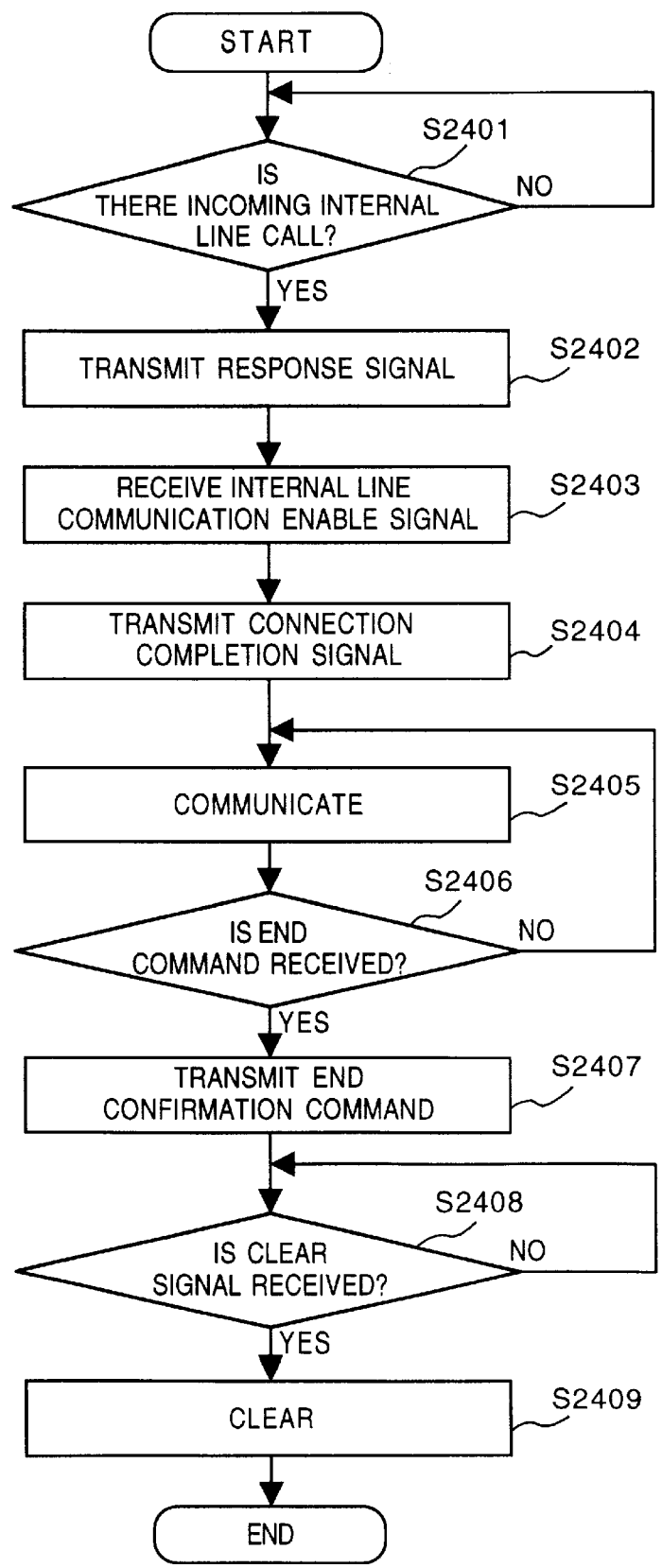
FIG. 24 is a flow chart of an internal-line operation of an incoming call to radio communication terminal equipment of the radio communication system according to the second embodiment of the invention.

2. Communication Between Data Terminals Via Local Internal Radio Communication Lines FIG. 21 illustrates a control data sequence used in internal-line communication among the main apparatus, connecting apparatus, calling data terminal equipment, and called data terminal equipment. FIG. 22 illustrates a process flow relating to the main apparatus, FIG. 23 illustrates a process flow relating to the calling communication terminal equipment, and FIG. 24 illustrates a process flow relating to the called communication terminal equipment, wherein these figures show only processes relating to operations discussed here.

If the radio communication terminal equipment 104-A desires to transmit some data (S2301), the radio communication terminal equipment 104-A transmits an internal-line communication request signal (2102) over a radio communication link between the radio communication terminal equipment 104-A and the connecting apparatus 2 using an LCCH-R in a PCF frame shown in FIG. 12 (S2302). When the connecting apparatus 2 receives the internal-line communication request signal (2102), the connecting apparatus 2 tells the main apparatus that the internal-line communication request signal has been received.

When the CPU 201 of the main apparatus receives the internal-line communication request signal (2102), the CPU 201 analyzes attributes of the calling radio communication terminal equipment 104-A. If it is concluded that internal-line communication is possible, the main apparatus transmits an internal-line communication enable signal (2103) to the radio communication terminal equipment 104-A via the connection apparatus 2 using an LCCH-T in a PCF frame.

When the radio communication terminal equipment 104-A receives the internal-line communication enable signal from the main apparatus (S2303), the radio communication terminal equipment 104-A acquires dial information (2108), and transmits the acquired dial information to the main apparatus 1 (S2304). The end of dial information is monitored by means of a timeout technique.

If the main apparatus 1 receives the dial information (2107) in step S2205, analyzes the dial information, and transmits an internal-line calling signal (2109) to the radio communication terminal equipment 104-E via the connecting apparatus 2 using an LCCH-T in a PCF frame.

If the radio communication terminal equipment 104-E receives the internal-line calling signal (2110), the radio communication terminal equipment 104-E transmits a connection signal (2112) to the connecting apparatus using an LCCH-R in a PCF frame thereby telling the main apparatus that connection has been made (S2402).

If the main apparatus 1 receives the connection signal (2112) from the radio communication terminal equipment 104-E (S2207), the main apparatus 1 transmits an internal-line calling acknowledgement signal (2113) to the radio communication equipment 104-A thereby notifying it that the calling signal has been accepted by the radio communication terminal equipment 104-E.

When the radio communication terminal equipment 104-A receives the internal-line calling acknowledgement signal, the radio communication terminal equipment 104-A transmits a connection-complete signal (2106) using an LCCH-R (in step S2306). The connection apparatus 2 transfers the connection-complete signal (2105) received from the radio communication terminal equipment 104-A to the main apparatus 1.

At the same time, the main apparatus 1 also transmits to the radio communication terminal equipment 104-E internal-line communication enable signal (2115) including information of communication resource such as a hopping pattern to be used in communication (S2208).

The radio communication terminal equipment 104-A knows from the internal-line calling acknowledgement signal (2114) that the called equipment has accepted the calling, and starts communication with the called equipment. On the other hand, when the radio communication terminal equipment 104-E receives the internal-line calling acknowledgement signal (2116), the radio communication terminal equipment 104-E extracts a hopping pattern from the communication resource information included in the internal-line calling acknowledgement signal (2116), and transmits a connection-complete signal (2118) in synchronization with the hopping pattern to the main apparatus 1.

After that, direct communication is performed between the radio communication terminal equipment 104-A and 104-E using a BDF frame shown in FIG. 14.

When the main apparatus 1 receives the connection-complete signal (2117) from the radio communication terminal equipment 104-E (in step S2209), the main apparatus 1 concludes that communication between the radio communication terminal equipment 104-A and 104-E has been started, and waits for completion of the internal-line communication between them (S2210).

When the communication is completed and the radio communication terminal equipment 104-A detects an end signal (S2309), the radio communication terminal equipment 104-A transmits an end-of-communication command to the radio communication terminal equipment 104-E (S2310). In response to the end-of-communication command received from the radio communication terminal equipment 104-A, the radio communication terminal equipment 104-E transmits an end-of-communication confirmation command (S2407) to the radio communication terminal equipment 104-A. When the radio communication terminal equipment 104-A receives the end-of-communication confirmation command (S2311), transmits an end-of-internal-line-communication signal (2123) to the main apparatus 1.

Upon reception of the end-of-internal-line-communication signal (S2210), the main apparatus 1 transmits a clear signal (2125) to the radio communication terminal equipment 104-A and 104-E (S2211).

If the radio communication terminal equipment 104-E receives the clear signal (2120), the radio communication terminal equipment 104-E transmits a clear confirmation signal (2121) via control information on a communication channel.

Upon reception of the clear confirmation signal (2121), the radio communication terminal equipment 104-A changes the communication channel to the logical control channel, and transmits an end-of-internal-line-communication signal (2123) to the connecting apparatus 2. The end-of-internal-line-communication signal (2102) is transmitted to the main apparatus 1, which in turn transmits a clear command (2124) to the radio communication terminal equipment 104-A. Furthermore, the main apparatus 1 transmits a clear command (2126) to the radio communication terminal equipment 104-E (S2211).

Figure 25:
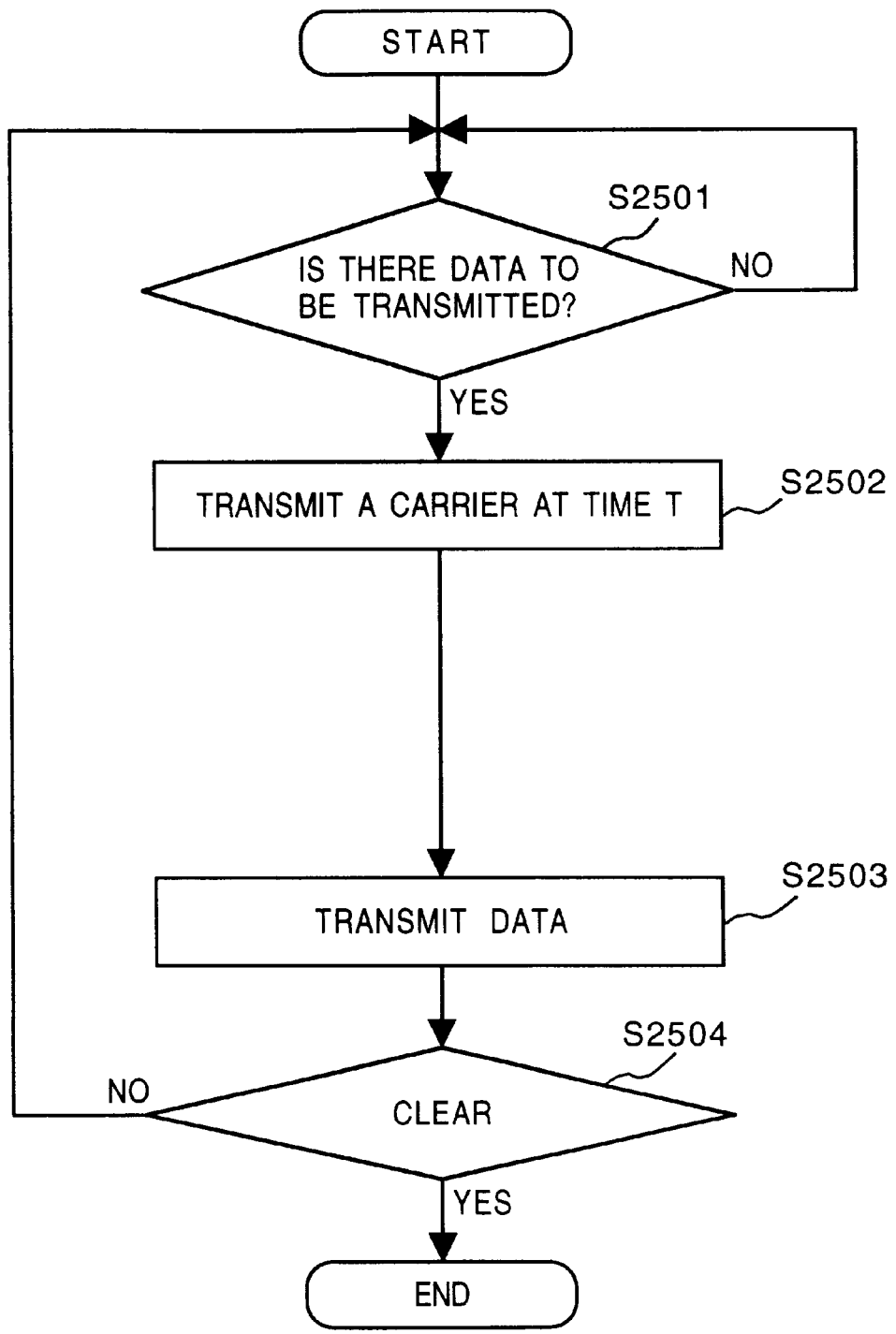
FIG. 25 is a flow chart of a data transmission operation of calling radio communication terminal equipment of the radio communication system according to the second embodiment of the invention.
Figure 26:
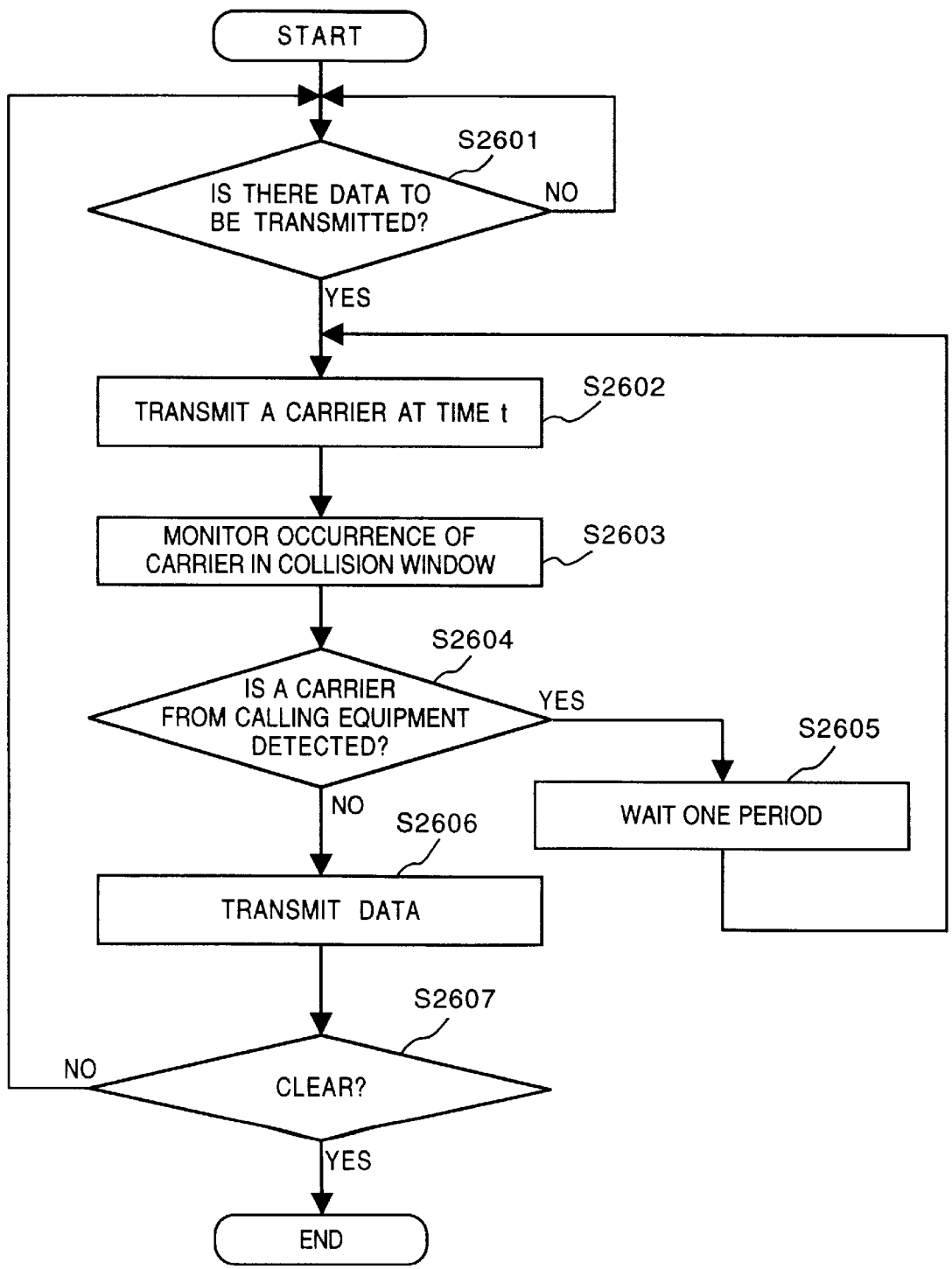
FIG. 26 is a flow chart of a data transmission operation of called radio communication terminal equipment of the radio communication system according to the second embodiment of the invention.

Then, the main apparatus 1 release the communication resource assigned to the radio communication terminal equipment (S2212). When the radio communication terminal equipment 104-A and 104-E receive the clear commands (2125, 2127), they release the resources. The above-described procedures are summarized in FIGS. 25, 26 and 27, wherein FIG. 25 is a flow chart illustrating the procedure in which the calling radio communication terminal equipment 104-A transmits data after completion of call setting between the main apparatus and the radio communication terminal equipment, FIG. 26 is a flow chart illustrating the procedure in which the called radio communication terminal equipment 104-E transmits data, FIG. 27 illustrates a manner of transmitting carriers at different times.

In the present embodiment, it is assumed that a higher priority in data transmission is assigned to the radio communication terminal equipment 104-A than the radio communication terminal equipment 104-E.

Thus, when the radio communication terminal equipment 104-A has data to be transmitted, the radio communication terminal equipment 104-A transmits a carrier indicating a request to start data transmission at a time T, whereas when the radio communication terminal equipment 104-E has data to be transmitted, the radio communication terminal equipment 104-E transmits a carrier indicating a request to start data transmission at a time t wherein T<t.

Figure 27:
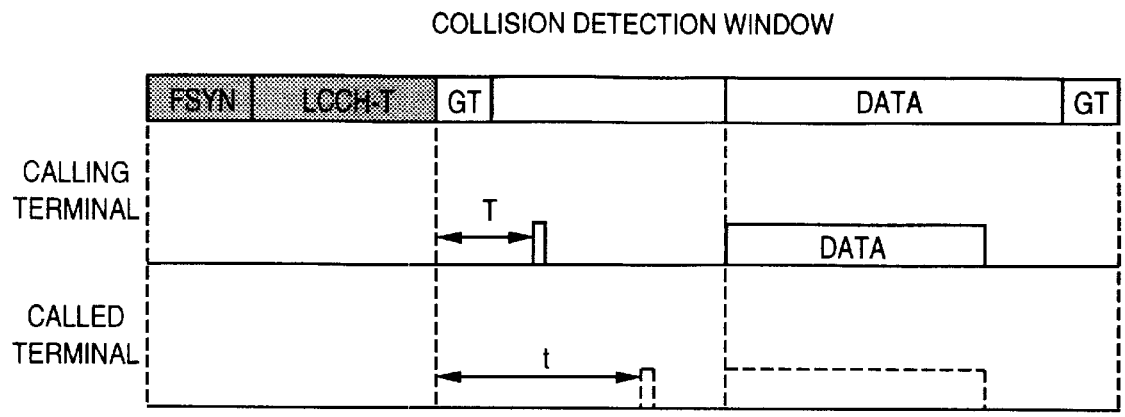
FIG. 27 is a schematic representation of a manner of transmitting carriers at different times,1 employed in the radio communication system according to the second embodiment of the invention.

In the case where the radio communication terminal equipment 104-A has data to be transmitted (S2501), after transmitting a carrier indicating a request to start data transmission at a time T shown in FIG. 27 (S2502), the radio communication terminal equipment 104-A starts data transmission (S2503). Then, it is monitored whether a request to end communication is issued by radio communication terminal equipment, and if a request to end communication is detected, the communication is terminated according to the procedure described above. If no request is detected, then the procedure returns to step S2501.

In the case where the radio communication terminal equipment 104-E has data to be transmitted (S2601), the radio communication terminal equipment 104-E transmits a carrier indicating a request to start data transmission at a time t shown in FIG. 27 (S2602), while the radio communication terminal equipment 104-E monitors whether a carrier signal requesting to start communication before the time t within the collision detection window. If a carrier signal requesting to start communication is detected at a time T (T<t) within the collision detection window, the radio communication terminal equipment 104-E waits for one period (S2605) and returns to step S2602. Contrarily, if no carrier signal requesting to start communication is detected at the time T S2604), the radio communication terminal equipment 104-E starts data communication (S2606). Then, it is monitored whether a request to end communication is issued by radio communication terminal equipment (S2607), and if a request to end communication is detected, the communication is terminated according to the procedure described above. The above operation is performed each time the frequency is switched.

In this technique, radio communication terminal equipment which transmitted a carrier signal requesting to start communication earlier than the other equipment can start data communication earlier, and thus the radio communication terminal equipment having a higher priority is adapted to transmit a carrier signal requesting to start communication earlier than lower-priority equipment so that it can start communication earlier than the other.

In this example, it is assumed that the radio communication terminal equipment 104-A has a higher priority than the radio communication terminal equipment 104-E. However, alternatively, the radio communication terminal equipment 104-E may be adapted to transmit a carrier signal at a time T and the radio communication terminal equipment 104-A may be adapted to transmit a carrier signal at a time t (T<t), so that the radio communication terminal equipment 104-E can start data communication earlier than the radio communication terminal equipment 104-A.

Furthermore, terminal equipment designed to transmit a carrier signal at a time t in a normal mode may start data communication earlier than the other in a special mode by switching the carrier transmitting time from t to T1 wherein 0<T1<T<t. This switching of the carrier transmitting time can be achieved by using an urgent transmission switch disposed on each radio communication terminal equipment, or inputting an urgent transmission command to the terminal equipment.

Figure 28:
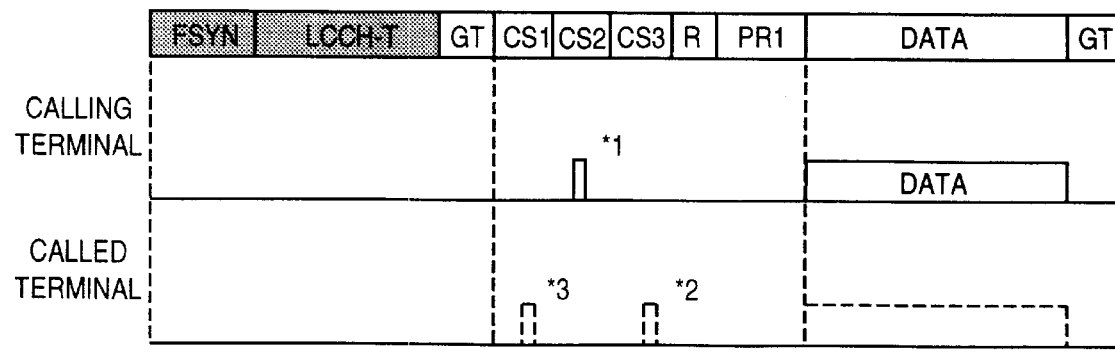
FIG. 28 is a schematic representation of a manner of transmitting carriers using time slots employed in the radio communication system according to a third embodiment of the invention.
Figure 29:
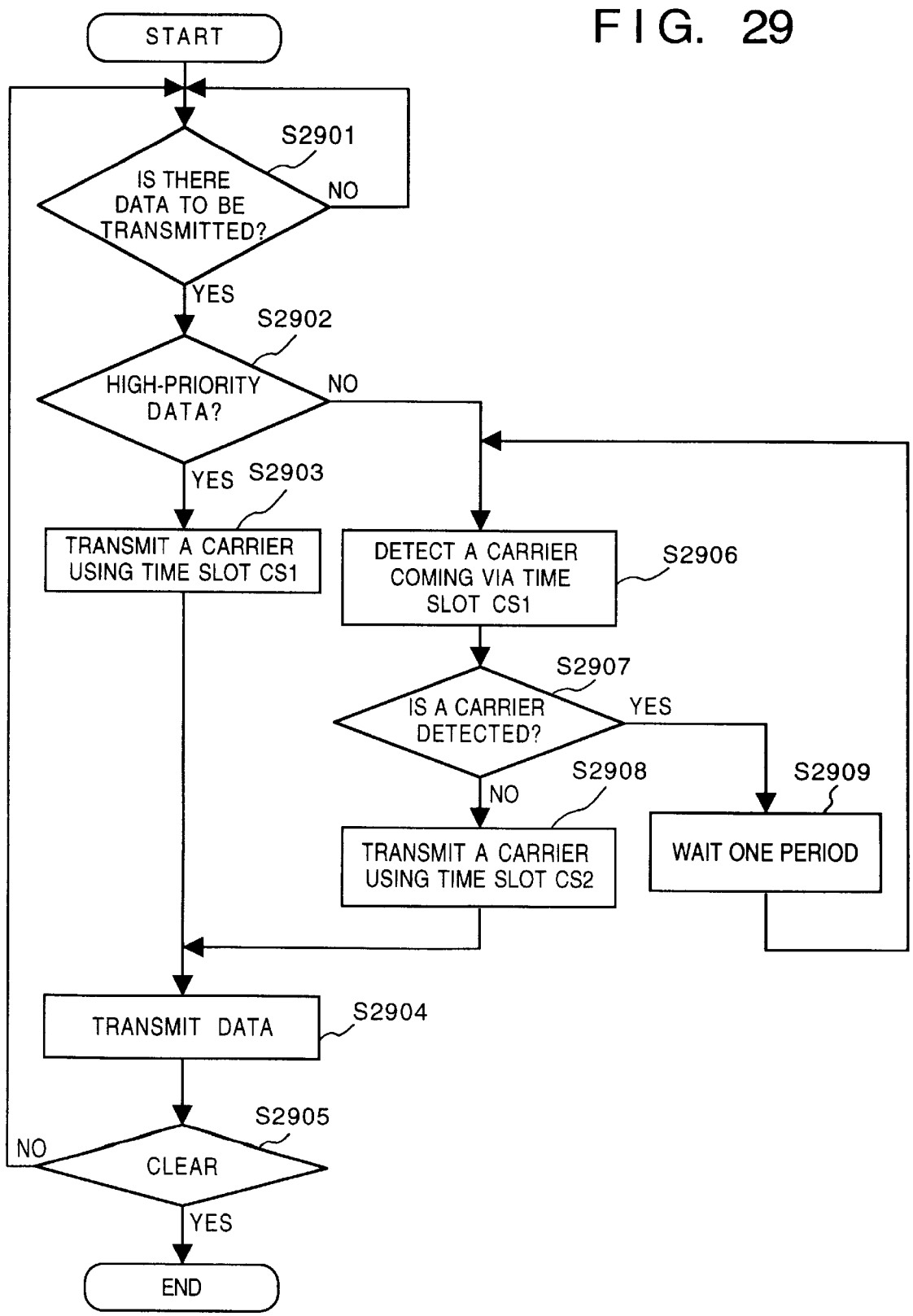
FIG. 29 is a flow chart of a data transmission operation of calling radio communication terminal equipment of the radio communication system according to the third embodiment of the invention.
Figure 30:
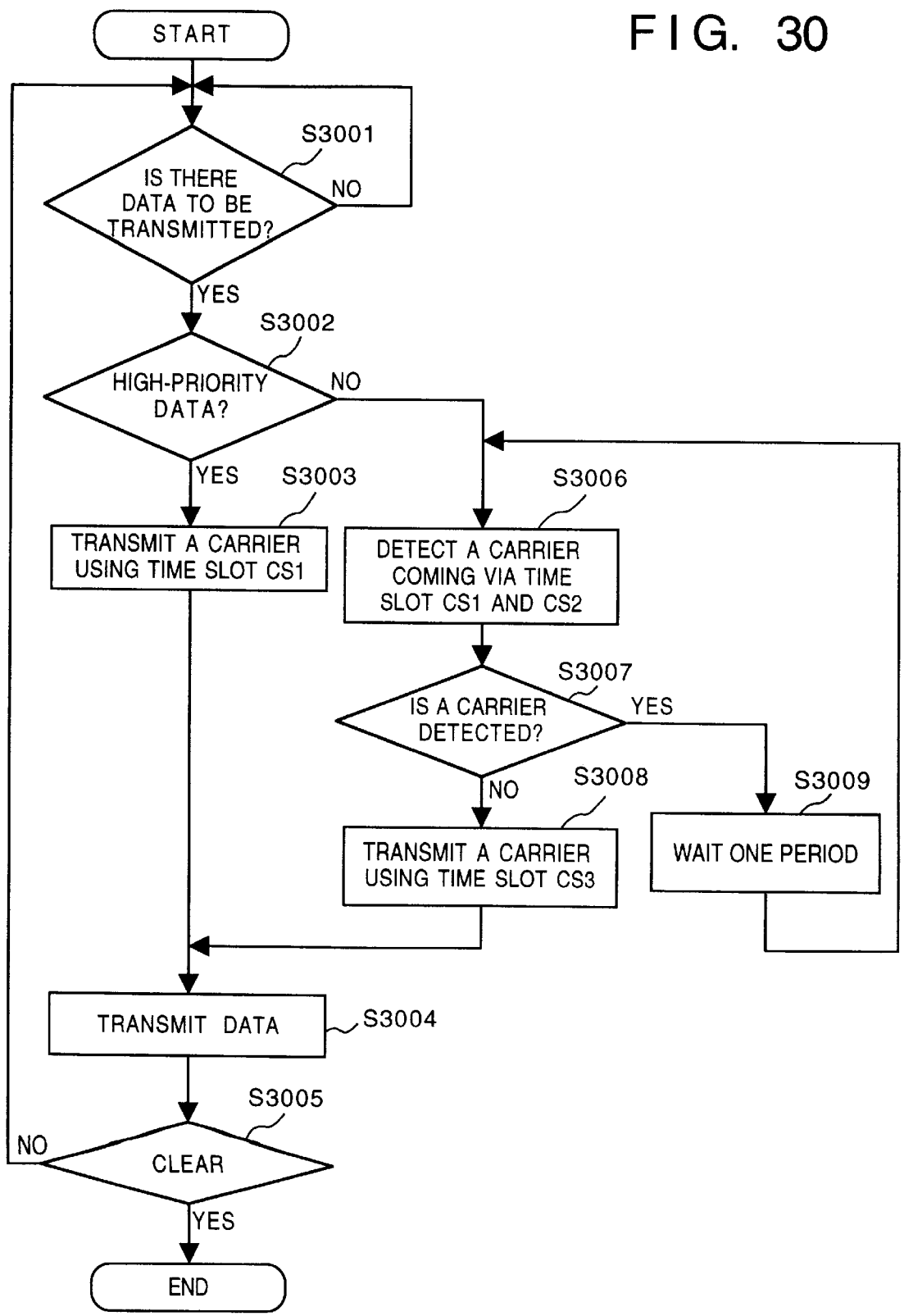
FIG. 30 is a flow chart of a data transmission operation of called radio communication terminal equipment of the radio communication system according to the third embodiment of the invention.

Now, a third embodiment will be described below referring to FIGS. 28, 29, and 30, wherein FIG. 28 illustrates a manner of transmitting a carrier signal using a time slot, FIG. 29 is a flow chart illustrating the data transmission procedure performed by calling radio communication terminal equipment using a time slot, and FIG. 30 is a flow chart illustrating the data transmission procedure performed by called radio communication terminal equipment using a time slot. The configurations of the system and each equipment are the same as those used in the second embodiment, and thus a duplicated description of those will not be given here. Also in this embodiment, it is assumed that the radio communication terminal equipment 104-A has a higher priority than the radio communication terminal equipment 104-E. When the radio communication terminal equipment 104-A has data to be transmitted, it transmits a carrier signal indicating a request to start communication using a time slot CS2 (denoted by "*1" in FIG. 28). On the other hand, when the radio communication terminal equipment 104-E has data to be transmitted, it transmits a carrier signal indicating a request to start communication using a time slot CS3 (denoted by "*2" in FIG. 28). If either terminal equipment 104-A or 104-E has data to be transmitted very urgently, either equipment can transmit a carrier signal requesting to start communication using a time slot CS1 (denoted by "*3" in FIG. 28).

As opposed to this example in which the radio communication terminal equipment 104-A has a higher priority than the radio communication terminal equipment 104-E, it is also possible to make priority assignment such that the radio communication terminal equipment 104-E has a higher priority than the radio communication terminal equipment 104-A.

Furthermore, either terminal equipment may also be adapted to transmit a carrier signal using a time slot CS1 if the terminal equipment has data to be transmitted urgently. This urgent carrier transmission can be achieved by using an urgent transmission switch disposed on each radio communication terminal equipment, or inputting an urgent transmission command to the terminal equipment.

After performing call setting between the main apparatus and radio communication terminal equipment, data communication between the radio communication terminal equipment 104-A (calling equipment in this example) and 104-E (called equipment in this example) is performed according to the procedure described below. When the radio communication terminal equipment 104-A has data to be transmitted (S2901), it determines the priority of the data in step S2902. If the data has a normal priority, then the radio communication terminal equipment 104-A monitors occurrence of a carrier signal at the time of time slot CS1 (S2906). If no carrier signal requesting to start communication is detected (S2907), after transmitting a carrier signal to indicate a request to start communication using a time slot CS2 ("*1" in FIG. 28) in step S2908, the radio communication terminal equipment 104-A performs data transmission (S2904). Then, it is monitored whether a request to end communication is issued by radio communication terminal equipment (S2905), and if a request to end communication is detected, the communication is terminated according to the procedure described above. On the other hand, if a carrier signal is detected in step S2907, then after waiting for one period (S2909), the radio communication terminal equipment 104-A monitors again occurrence of a carrier signal (S2906). If it is concluded in the above-described step S2902 that the data has a high priority, then, after transmitting a carrier signal to request to start communication using a time slot CS1 ("*3" in FIG. 28) in step S2909, the radio communication terminal equipment 104-A performs data transmission (S2904). Then, it is monitored whether a request to end communication is issued by radio communication terminal equipment (S2905), and if a request to end communication is detected, the communication is terminated according to the procedure described above. On the other hand, when the radio communication terminal equipment 104-E has data to be transmitted (S3001), it determines the priority of the data in step S3002. If the data has a normal priority, then the radio communication terminal equipment 104-A monitors occurrence of a carrier signal at the times of time slots CS1 and CS2(S3006). If no carrier signal requesting to start communication is detected (S3007), after transmitting a carrier signal to indicate a request to start communication using a time slot CS3 ("*2" in FIG. 28) in step S3008, the radio communication terminal equipment 104-E transmits the data (S3004). Then, it is monitored whether a request to end communication is issued by radio communication terminal equipment (S3005), and if a request to end communication is detected, the communication is terminated according to the procedure described above. On the other hand, if a carrier signal is detected in step S3007, then, after waiting for one period (S3009), the radio communication terminal equipment 104-E monitors again occurrence of a carrier signal (S3006).

If it is concluded in the above-described step S3002 that the data has a high priority, then, after transmitting a carrier signal to request to start communication using a time slot CS1 ("*3" in FIG. 28) in step S3003, the radio communication terminal equipment 104-E transmits the data (S3004). Then, it is monitored whether a request to end communication is issued by radio communication terminal equipment (S3005), and if a request to end communication is detected, the communication is terminated according to the procedure described above.

As can be seen from the above discussion, this embodiment of the invention allows even low-priority radio communication terminal equipment to transmit urgent data earlier than the other terminal equipment.

In the second and third embodiments described above, it is assumed that a higher priority is assigned to the radio communication terminal equipment 104-A than the radio communication terminal equipment 104-E. However, in this invention, priorities of the terminal equipment and data may be assigned in an arbitrary manner.

In the third embodiment, carrier signals to indicate a request to start communication are assumed to be transmitted using time slots CS1, CS2, and CS3. Alternatively, a greater number of time slots may be used for the same purpose. In this case, it is possible to have a greater number of levels in the priority setting.

Furthermore, it will be apparent to those skilled in the art that the present invention may also be implemented or embodied using a programming technique.

Whereas a frequency hopping technique is used to accomplish radio communication in the first and second embodiments described above, spread spectrum communication technique may also be employed.

While the present invention has been described with reference to specific embodiments, the description is illustrative of the invention and is not to be construed as limiting the invention. It should be understood that various modifications, substitutions and alterations can be made herein without departing from the spirit and scope of the invention as defined by the appended claims.

What is claimed is:

1. A radio communication apparatus for avoiding a collision between data to be transmitted and data transmitted by another radio communication apparatus, by notifying another radio communication apparatus of transmitting data by transmitting a first carrier prior to the data transmission, and by transmitting the first carrier after a predetermined time has passed in a case where a second carrier transmitted by another radio communication apparatus is detected before transmitting the first carrier, said apparatus comprising;

distinction means for distinguishing priority of data to be transmitted;

determining means for determining a time for transmitting said first carrier to notify of transmitting the data, according to the priority distinguished by said distinction means;

detection means for detecting said second carrier transmitted by another radio communication apparatus while the time determined by said determining means passes;

first transmission means for transmitting said first carrier, according to the detection by said detection means; and second transmission means for transmitting data after said first carrier has been transmitted by said first transmission means.

2. A radio communication apparatus according to claim 1, wherein said detection means performs said detection when the data transmission by another radio communication apparatus ends.

3. A radio communication apparatus according to claim 1, wherein said determining means also determines a transmission interval of the first carrier transmitted in succession by said first transmission means.

4. A radio communication apparatus according to claim 1, wherein said determining means determines a time for transmitting said first carrier in a random manner within predetermined limits.

5. A radio communication apparatus according to claim 1, wherein said determining means determines the time to be a shorter value when said data to be transmitted has a higher priority.

6. A radio communication apparatus for avoiding a collision between data to be transmitted and data transmitted by another radio communication apparatus, by notifying another radio communication apparatus of transmitting data by transmitting a first carrier into a predetermined time slot in a communication frame prior to the data transmission using the communication frame, and by transmitting the first carrier after a predetermined time has passed in a case where a second carrier transmitted by another radio communication apparatus is detected before transmitting the first carrier, said apparatus comprising:

distinction means for distinguishing a priority of data to be transmitted;

detection means for detecting said second carrier transmitted by another radio communication apparatus;

first transmission means for transmitting said first carrier using a time slot in accordance with the priority distinguished by said distinction means, according to the detection by said detection means; and second transmission means for transmitting data after said first carrier has been transmitted by said first transmission means.

7. A radio communication apparatus according to claim 6, wherein said detection means performs said detection when the data transmission by another radio communication apparatus ends.

8. A radio communication apparatus according to claim 6, wherein said detection means also detects said second carrier in accordance with the data to be transmitted.

9. A radio communication apparatus according to claim 6, wherein said first carrier is transmitted by using the time slot which differs in accordance with whether the radio communication apparatus to transmit said first carrier is a calling side or a called side.

10. A radio communication apparatus according to claim 9, wherein said first carrier is transmitted by using a high priority time slot in a case where said first carrier is transmitted by the calling radio communication apparatus and a low priority to the time slot in a case where said first carrier is transmitted by the called radio communication apparatus.

11. A radio communication apparatus according to claim 9, wherein said first carrier is transmitted by using a high priority time slot in a case where said first carrier is transmitted by the called radio communication apparatus and a low priority time slot in a case where said first carrier is transmitted by the calling radio communication apparatus.

12. A radio communication apparatus according to claim 6, wherein, in a case where data to be transmitted is a top priority, said first carrier is transmitted by using a highest priority time slot.

13. A radio communication apparatus according to claim 6, wherein said second transmission means performs its transmission operation according to a frequency hopping technique.

14. An exchange system including a main apparatus having exchanging capability and also including radio communication apparatus for avoiding a collision between data to be transmitted and data transmitted by another radio communication apparatus, by notifying another radio communication apparatus of transmitting data by transmitting a first carrier into a predetermined time slot in a communication frame prior to the data transmission using the communication frame, and by transmitting the first carrier after a predetermined time has passed in a case where a second carrier transmitted by another radio communication apparatus is detected before transmitting the first carrier, said exchange system comprising:

distinction means for distinguishing priority of data to be transmitted;

detection means for detecting said second carrier transmitted by another radio communication apparatus;

first transmission means for transmitting said first carrier using a time slot in accordance with the priority distinguished by said distinction means, according to the detection by said detection means; and second transmission means for transmitting data after said first carrier has been transmitted by said first transmission means.

15. An exchange system according to claim 14, wherein said detection means performs said detection when the data transmission by another radio communication apparatus ends.

16. An exchange system according to claim 14, wherein said detection means detects said second carrier in a time slot in accordance with data to be transmitted.

17. An exchange system according to claim 14, wherein said first carrier is transmitted by using the time slot which differs in accordance with whether the radio communication apparatus to transmit said first carrier is a calling side or a called side.

18. An exchange system according to claim 17, wherein said first carrier is transmitted by using a high priority time slot in a case where said first carrier is transmitted by the calling radio communication apparatus and a low priority time slot in a case where said first carrier is transmitted by the called radio communication apparatus.

19. An exchange system according to claim 17, wherein said first carrier is transmitted by using a high priority time slot in a case where said first carrier is transmitted by the called radio communication apparatus and a low priority time slot in a case where said first carrier is transmitted by the calling radio communication apparatus.

20. An exchange system according to claim 14, wherein, in a case where data to be transmitted is a top priority, said first carrier is transmitted by using a highest priority time slot.

21. An exchange system according to claim 14, wherein said second transmission means performs its transmission operation according to a frequency hopping technique.

22. A control method of a radio communication apparatus for avoiding a collision between data to be transmitted and data transmitted by another radio communication apparatus, by notifying another radio communication apparatus of transmitting data by transmitting a first carrier prior to the data transmission, and by transmitting the first carrier after a predetermined time has passed in a case where a second carrier transmitted by another radio communication apparatus is detected before transmitting the first carrier, said method comprising the steps of:

distinguishing priority of data to be transmitted;

determining a time for transmitting said first carrier to notify of transmitting the data, according to the priority distinguished in said distinguishing step;

detecting said second carrier transmitted by another radio communication apparatus while the time determined in said determining step passes;

first transmitting said first carrier, according to the detection in said detecting step; and secondly transmitting data after said first carrier has been transmitted in said first transmitting step.

23. A radio communication method according to claim 22, wherein said detecting step performs said detection when the data transmission by another radio communication apparatus ends.

24. A radio communication method according to claim 22, wherein said determining step further includes the step of determining a transmission interval of the first carrier transmitted in succession in the first transmitting step.

25. A radio communication method according to claim 22, wherein said determining step determines a time for transmitting said first carrier in a random manner within predetermined limits.

26. A radio communication method according to claim 22, wherein said determining step determines the time to be a shorter value when said data to be transmitted has a higher priority.

27. A control method of a radio communication apparatus for avoiding a collision between data to be transmitted and data transmitted by another radio communication apparatus, by notifying another radio communication apparatus of transmitting data by transmitting a first carrier into a predetermined time slot in a communication frame prior to the data transmission using the communication frame, and by transmitting the first carrier after a predetermined time has passed in a case where a second carrier transmitted by another radio communication apparatus is detected before transmitting the first carrier, said method comprising the steps of:

distinguishing priority of data to be transmitted;

detecting said second carrier transmitted by another radio communication apparatus;

first transmitting said first carrier using a time slot in accordance with the priority distinguished in said distinguishing step, according to the detection in said detecting step; and second transmitting data after said first carrier has been transmitted in said first carrier transmitting step.

28. A radio communication method according to claim 27, wherein said detecting step performs said detection when the data transmission by another radio communication apparatus ends.

29. A radio communication method according to claim 27, wherein said detection step includes detecting said second carrier in accordance with data to be transmitted.

30. A radio communication method according to claim 29, wherein, in a case where data to be transmitted is a top priority, said first carrier is transmitted by using a highest priority time slot.

31. A radio communication method according to claim 27, wherein said first carrier is transmitted by using the time slot which differs in accordance with whether the radio communication apparatus to transmit said first carrier is a calling side or a called side.

32. A radio communication method according to claim 31, wherein said first carrier is transmitted by using a high priority time slot in a case where said first carrier is transmitted by the calling radio communication apparatus and a low priority time slot in a case where said first carrier is transmitted by the called radio communication apparatus.

33. A radio communication method according to claim 31, wherein said first carrier is transmitted by using a high priority time slot in a case where said first carrier is transmitted by the called radio communication apparatus and a low priority time slot in a case where said first carrier is transmitted by the calling radio communication apparatus.

34. A radio communication method according to claim 27, wherein said second transmitting step performs its transmission operation according to a frequency hopping technique.

35. A control method for an exchange system including a main apparatus having exchanging capability and also including radio communication apparatus for avoiding a collision between data to be transmitted and data transmitted by another radio communication apparatus, by notifying another radio communication apparatus of transmitting data by transmitting a first carrier into a predetermined time slot in a communication frame prior to the data transmission using the communication frame, and by transmitting the first carrier after a predetermined time has passed in a case where a second carrier transmitted by another radio communication apparatus is detected before transmitting the first carrier, said method comprising the steps of:

distinguishing priority of data to be transmitted;

detecting said second carrier transmitted by another radio communication apparatus;

first transmitting said first carrier using a time slot in accordance with the priority distinguished in said distinguishing step, according to the detection in the detection step; and second transmitting data after said first carrier has been transmitted in said first transmitting step.

36. A radio communication method according to claim 35, wherein said detecting step performs said detection when the data transmission by another radio communication apparatus ends.

37. A radio communication method according to claim 36, wherein, in a case where data to be transmitted is a top priority, said first carrier is transmitted by using a highest priority time slot.

38. A radio communication method according to claim 35, wherein said detection step includes detecting said second carrier in accordance with data to be transmitted.

39. A radio communication method according to claim 35, wherein said first carrier is transmitted by using the time slot which differs in accordance with whether the radio communication apparatus to transmit said first carrier is a calling side or a called side.

40. A radio communication method according to claim 39, wherein said first carrier is transmitted by using a high priority time slot in a case where said first carrier is transmitted by the calling radio communication apparatus and a low priority time slot in a case where said first carrier is transmitted by the called radio communication apparatus.

41. A radio communication method according to claim 39, wherein said first carrier is transmitted by using a high priority time slot in a case where said first carrier is transmitted by the called radio communication apparatus and a low priority time slot in a case where said first carrier is transmitted by the calling radio communication apparatus.

42. A radio communication method according to claim 35, wherein said second transmitting step performs its transmission operation according to a frequency hopping technique.

43. A communication apparatus for performing communication using a time-division multiplexing technique, said apparatus comprising:

identifying means for identifying the priority of communication data;

selecting means for selecting a usable one time slot from among three time slots, in which a first time slot is used for performing a predetermined notification at a calling side communication apparatus, a second time slot is used for performing the predetermined notification at a called side communication apparatus, and a third time slot, usable at both the calling side communication apparatus and the called side communication apparatus, is used for performing the predetermined notification at a high priority according to the identified result by said identifying means; and notifying means for performing the predetermined notification by using the time slot based on the selection by said selection means.

44. A communication apparatus according to claim 43, wherein said notification is performed by sending a request-to-send for notifying another communication apparatus of transmitting data in the first time slot, the second time slot, or the third time slot, according to the result of identification by said identifying means.

45. A communication apparatus according to claim 43, wherein said notification is performed by transmitting a carrier serving as a request-to-send.

46. A communication apparatus according to claim 43, further comprising detecting means for detecting said request-to-send transmitted in the first time slot, the second time slot, or the third time slot, wherein said notification is performed by using a fourth time slot, if said request to send is not detected by said detecting means.

47. A communication apparatus according to claim 43, wherein said notification is performed via a radio wave.

48. A communication method for performing communication using a time-division multiplexing technique, said method comprising the steps of:

identifying the priority of communication data;

selecting a usable one time slot from among three time slots, in which a first time slot is used for performing a predetermined notification at a calling side communication apparatus, a second time slot is used for performing the predetermined notification at a called side communication apparatus, and a third time slot, usable at both the calling side communication apparatus and the called side communication apparatus, is used for performing the predetermined notification at a high priority according to the identified result in said identifying step; and performing the predetermined notification by using the time slot based on the selection in said selecting step.

49. A communication method according to claim 48, wherein said notification is performed by sending a request-to-send for notifying another communication apparatus of transmitting data in the first time slot, the second time slot, or the third time slot according to the result obtained in said identifying step.

50. A communication method according to claim 49, further comprising the step of detecting said request-to-send transmitted in the first time slot, the second time slot, or the third time slot, wherein said notification is performed by using a fourth time slot, if said request-to-send is not detected.

51. A communication method according to claim 48, wherein said notification is performed by transmitting a carrier serving as a request-to-send.

52. A communication method according to claim 48, wherein said notification is performed via a radio wave.

* * * * *

UNITED STATES PATENT AND TRADEMARK OFFICE
CERTIFICATE OF CORRECTION

PATENT NO.  : 5,966,375
DATED       : October 12, 1999
INVENTOR(S) : NAOTO KAGAYA It is certified that error appears in the above-identified patent and that said Letters Patent is hereby corrected as shown below:

COLUMN 3:
Line 21, "a" should read --an--.

COLUMN 4:
Line 58, "carries" should read --carriers--.

COLUMN 5:
Line 40, "describe" should read --described--; and
Line 53, "terminal-equipment" should read --terminal equipment--.

COLUMN 6:
Line 39, "present-embodiment." should read --present embodiment.--.

COLUMN 7:
Line 47, "apparatus 1." should read --apparatus 1;--; and
Line 63, "frame.)" should read --frame.--.

COLUMN 14:
Line 48, "mits" should read --mit--; and
Line 52, "completed" should read --completed.--.

UNITED STATES PATENT AND TRADEMARK OFFICE
CERTIFICATE OF CORRECTION

PATENT NO. : 5,966,375
DATED : October 12, 1999
INVENTOR(S) : NAOTO KAGAYA

It is certified that error appears in the above-identified patent and that said Letters Patent is hereby corrected as shown below:

COLUMN 17:
Line 61, "release" should read --releases--.

COLUMN 18:
Line 44, "S2604)," should read --(S2604),--.

COLUMN 21:
Line 22, "ing;" should read --ing:--.

COLUMN 26:
Line 49, "claim 48," should read --claim 49,--.

Signed and Sealed this

Nineteenth Day of September, 2000

Q. TODD DICKINSON

Attest:

Attesting Officer

Director of Patents and Trademarks